(12) United States Patent
Ohtake et al.

(10) Patent No.: US 7,411,731 B2
(45) Date of Patent: Aug. 12, 2008

(54) ZOOM LENS AND IMAGING APPARATUS

(75) Inventors: Motoyuki Ohtake, Saitama (JP);
Tsutomu Naitou, Kanagawa (JP);
Takuya Tsutsumi, Tokyo (JP); Eiji Yano, Tokyo (JP); Ken Tanaka, Tokyo (JP); Tatsuyuki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 11/553,281

(22) Filed: Oct. 26, 2006

(65) Prior Publication Data

US 2007/0097516 A1   May 3, 2007

(30) Foreign Application Priority Data

Oct. 27, 2005   (JP)   ............................. 2005-313255

(51) Int. Cl.
*G02B 27/64* (2006.01)
(52) U.S. Cl. ........................... 359/557; 359/554; 396/55
(58) Field of Classification Search ................. 359/554, 359/557, 678, 813; 396/55
See application file for complete search history.

(56) References Cited

U.S. PATENT DOCUMENTS

| 5,182,671 | A | 1/1993 | Kitagishi et al. |
| 6,246,520 | B1* | 6/2001 | Iizuka .......................... 359/557 |
| 6,282,376 | B1* | 8/2001 | Shiomi .......................... 396/55 |
| 2002/0102102 | A1 | 8/2002 | Watannabe et al. |

OTHER PUBLICATIONS

U.S. Appl. No. 11/580,161, filed Oct. 13, 2006, Ohtake, et al.
U.S. Appl. No. 11/553,281, filed Oct. 26, 2006, Ohtake, et al.

* cited by examiner

*Primary Examiner*—Hung X. Dang
*Assistant Examiner*—Joseph Martinez
(74) *Attorney, Agent, or Firm*—Oblon, Spivak, McClelland, Maier & Neustadt, P.C.

(57) ABSTRACT

A zoom lens includes a varifocal lens unit including a plurality of movable lens groups, and a prism disposed on an image side of the varifocal lens unit. The prism has an incident plane into which a light flux from the varifocal lens unit enters, and an exit plane from which the light flux is emitted toward an image plane, the exit plane capable of being inclined with respect to an optical axis, the exit plane inclined in accordance with a following conditional expression "$\alpha = -f \times \theta / [Bf(n-1)]$", where $\alpha$: an angle formed by a normal of the exit plane and the optical axis, f: a focus distance of a whole lens system, $\theta$: a turning angle of a lens system, Bf: a distance from the exit plane of the prism to the image plane along the optical axis, and n: a refraction index of the prism.

8 Claims, 27 Drawing Sheets

LATERAL ABERRATION

LATERAL ABERRATION

LATERAL ABERRATION

ZOOM LENS AND IMAGING APPARATUS

BACKGROUND OF THE INVENTION

1. Field of the Invention

The present invention relates to a zoom lens and an imaging apparatus, and more particularly to a zoom lens that enables an image shift by using a variable apex angle prism and an imaging apparatus using the zoom lens.

2. Description of the Related Art

In related art, as recording means for a camera, there has been known a method of converting an amount of light of a subject image formed on an imaging device surface into an electric output by means of a photosensor such as a charge coupled device (CCD), a complementary metal-oxide semiconductor (CMOS) or the like to record the converted electric output.

As microprocessing techniques have advanced in recent years, speeding up the central processing unit (CPU) and the enhancement of high-density-integration of the recording medium have been achieved, and it has been becoming possible to perform high speed processing of large size image data, which had not been able to handle until recently. Moreover, the enhancement of high-density-integration and the reduction in size have been attained for the light receiving element as well. As a result, recording of higher spatial frequency has been achieved, enabling the reduction in the whole size of a camera by the reduction in size of the light receiving element.

However, the light receiving area of individual photosensor has been reduced and the electric output thereof has been lowered owing to the enhancement of high-density-integration and the size reduction mentioned above, and an issue of increasing influences of noises due to lower electric output has been brought about. For addressing such an issue, the amount of light reaching the light receiving element has been increased by enlarging the aperture ratio of an optical system, or micro lens element (the so-called microlens array) has been disposed just before each element. The microlens array has restricted the exit pupil position of the lens system in compensation for introducing the light flux reaching a position between adjacent elements onto the elements. The reason of the restriction is that, if the exit pupil position of a lens system approaches the light receiving element, i.e. if the angle formed between the principal ray reaching the light receiving element and the optical axis becomes large, off-axis light fluxes advancing the peripheral portions of the image plane area forms large angles to the optical axis, and the off-axis light fluxes do not reach the light receiving element and causes the insufficiency of light.

As a zoom lens suitable for a video camera, a digital still camera and the like, each of which records a subject image by means of the photosensors, for example, a positive, negative, positive, positive four-group zoom lens has been known.

The positive, negative, positive, positive four-group zoom lens includes a first lens group having positive refractive power, a second lens group having negative refractive power, a third lens group having positive refractive power and a fourth lens group having positive refractive power, which are arranged in order from the object side. When the lens position arrangement of the four-group zoom lens changes from its wide angle end to its telephoto end, the first and the third lens groups are fixed in the optical axis direction, and a zoom operation is performed by the movement of the second lens group, and further the fourth lens group performs the operation of compensating the variation of the image plane position generated by the movement of the second lens group. A specific technique described in Japanese Patent Application Publication No. H06-337353 is known.

Now, because the angle of view at the telephoto end becomes narrow in a zoom lens having a large zoom ratio, such a lens has an issue such that even a minute camera shake causes a large movement of image.

As one of camera shake correction systems for correcting the movement of an image caused by the camera shake or the like, an optical camera shake correction system is known.

In the optical camera shake correction system, by combining a detection system for detecting a movement of a camera accompanying a camera shake caused by such as a shutter release, a control system for producing a displacement in a drive system based on a signal output from the detection system, the drive system for driving an optical system based on an output from the control system, and the optical system capable of shifting an image when the displacement is supplied from the drive system, the movement of an image caused by the movement of the camera can be cancelled and corrected by the movement of the image caused by the displacement of the optical system.

As the optical system to be used in the optical camera shake correction system, a lens shift system for shifting a part of a lens system in a direction perpendicular to an optical axis, a variable apex angle prism system for changing the apex angle of a prism disposed just before a lens system, and the like are known.

In such a lens shift system, there is an issue such that the number of lenses increases in order to suppress the change of optical performance that may occur at the time of shifting a predetermined lens, and it is difficult to reduce electric power consumption because the system requires to hold the lenses in the air (at a neutral position).

The variable apex angle prism system does not have the above-mentioned issue existing in the lens shift system.

The variable apex angle prism system may be classified into two categories, one in which a variable apex angle prism is disposed at a position nearest to the object side of the optical system, and the other in which a variable apex angle prism is disposed in the optical system.

As an example of disposing the variable apex angle prism at a position nearest to the object side, an optical system disclosed in Japanese Patent Application Publication No. S51-40942 exists.

In the case where the variable apex angle prism is disposed at a position nearest to the object side, there is a feature such that a change in the angle of view in relation to an amount of change in the apex angle does not depend on the focus distance of the zoom lens. When the movement of an image caused by a movement of a camera accompanying a camera shake or the like is corrected, the feature mentioned above has an advantage such that the apex angle can be controlled independently of the focus distance of the zoom lens. However, because the movement of the image is greatly caused in the telephoto state on the other hand, the technique disclosed in Japanese Patent Application Publication No. S51-40942 has an issue such that, in case of a large zoom ratio, stopping accuracy becomes extremely high in the telephoto state and improvement of the accuracy of the drive mechanism is required.

Moreover, because the variable apex angle prism is disposed on the object side of the first lens group having a large lens diameter, the diameter of the light flux entering the variable apex angle prism is large. As a result, there is an issue such that the variable apex angle prism itself becomes very large in size. Moreover, it is necessary to provide protection means such as disposing a protection glass in order that a hand of a user may not directly touch the variable apex angle prism. As a result, the miniaturization of the system has a limit.

On the other hand, as examples of having the variable apex angle prism in an optical system, those disclosed in Japanese Patent Application Publication Nos. S62-153816, H02-168223, H10-246855, H11-44845 and the like are known.

The optical system disclosed in Japanese Patent Application Publication No. S62-153816 places a variable apex angle prism at a part where light becomes a parallel light flux. The optical system disclosed in Japanese Patent Application Publication No. H02-168223 disposed a variable apex angle prism before the master lens group thereof. The optical systems disclosed in Japanese Patent Application Publication Nos. H10-246855 and H11-44845 severally dispose a variable apex angle prism in the neighborhood of an aperture diaphragm.

Because the on-axis light flux enters the variable apex angle prism as near to a parallel light in each of the optical systems disclosed in Japanese Patent Application Publication Nos. S62-153816, H02-168223, H10-246855, H11-44845, each of the optical systems has a feature such that the variation of an on-axis aberration, which occur when a prism angle is changed, can be suppressed.

A light flux which passes an optical system reaches an image plane while being refracted by lenses. A light flux toward the central portion of an image plane area reaches the image plane while being diverge or converge. Simultaneously, the principal ray toward the peripheral portion of the image plane area reaches the image plane while changing the angle formed with the optical axis.

Accordingly, when a variable apex angle prism is disposed in the optical system, it is possible to reduce a size of the system in comparison with the case where the variable apex angle prism is disposed on the object side to the first lens group. On the other hand, such a system has its issue such that a coma aberration may occur, a chromatic aberration may vary, or a trapezoid distortion may occur.

In particular, when the trapezoid distortion occurs, it is very difficult to correct image blur in the peripheral portion of the image plane area even if the image blur can be well corrected in the central portion of the image plane area, whereby the trapezoid distortion poses a critical issue. The trapezoid distortion tends to occur at a position where the principal ray forms a large angle with the optical axis when a light flux is not a parallel light.

SUMMARY OF THE INVENTION

There is an issue such that a prism control is difficult when a variable apex angle prism is disposed just before a lens system because the angle of deviation of the prism required for correcting the image blur caused by shifting of a camera does not depend on a focus distance.

This difficulty originates in the difference of resolution of the angles of deviations necessary in a wide angle end, in which the focus distance is shortest, and in a telephoto end, in which the focus distance is longest, when the variable apex angle prism is applied to a zoom lens.

To put it concretely, an angle of deviation $\alpha 0'$, which occurs when the prism apex angle is inclined by an angle $\alpha 0$ in the case where the variable apex angle prism is disposed on the object side of the zoom lens, can be calculated by an expression: $\alpha 0'=\sin^{-1}(n \times \sin \alpha 0)-\alpha 0$. At this time, when it is supposed that both the angles $\alpha 0$ and $\alpha 0'$ are minute values, the exit angle (the angle of deviation) $\alpha 0'$ becomes: $\alpha 0'=\alpha 0(n-1)$.

When a movement angle of a camera, i.e. a turning angle of a lens system, which had originated in a camera shake or the like, was denoted by $\theta$, it was possible to correct the image blur by changing the prism apex angle so as to satisfy an expression: $\alpha 0'+\theta=0$.

Accordingly, it is desirable to provide a zoom lens in which a resolution of an angle of deviation of a prism does not depend on a focus distance, and an imaging apparatus using such a zoom lens.

For addressing the issues mentioned above, a zoom lens according to a first aspect of the present invention includes a varifocal lens unit having a plurality of movable lens groups, and a prism disposed on an image side of the varifocal lens unit. The prism has an incident plane into which a light flux from the varifocal lens unit enters, and an exit plane from which the light flux is emitted toward an image plane, the exit plane capable of being inclined with respect to an optical axis, the exit plane inclined in accordance with a following conditional expression (1), $$\alpha=-f\times\theta/[Bf(n-1)] \quad (1)$$

where $\alpha$ is an angle formed by a normal of the exit plane and the optical axis, f is a focus distance of a whole lens system, $\theta$ is a turning angle of a lens system, Bf is a distance from the exit plane of the prism to the image plane along the optical axis, and n is a refraction index of the prism.

According to another embodiment of the present invention, there is provided a zoom lens includes a varifocal lens unit including a plurality of movable lenses, and a prism disposed on an image side of the varifocal lens unit. The prism has an incident plane into which a light flux from the varifocal lens unit enters, and an exit plane from which the light flux is emitted toward an image plane, the incident plane capable of being inclined with respect to an optical axis, the incident plane being inclined in accordance with a following conditional expression (2), $$\alpha=-f\times\theta/[(Bf+D/n)\times(n-1)] \quad (2)$$

where $\alpha$ is an angle formed by a normal of the incident plane with the optical axis, f is a focus distance of a whole lens system, $\theta$ is a turning angle of a lens system, Bf is a distance from the exit plane of the prism to the image plane along the optical axis, n is a refraction index of the prism, and D is a thickness of the prism.

Accordingly, in the zoom lenses according to the embodiments of the present invention, a deviation of the field of view caused by the tumbling of the lens system can be corrected by inclining the incident plane or the exit plane.

Furthermore, the prism can be configured to be small in size, and the lens system can be configured to be small in size as a result. Furthermore, the occurrence of coma aberration and trapezoid distortion when the exit plane or the incident plane is inclined can be suppressed, and a good optical performance can be obtained.

According to another embodiment of the present invention, there is provided an imaging apparatus including a zoom lens, an imaging device converting an optical image formed by the zoom lens into an electric signal, camera shake detection means for detecting a turning angle of the zoom lens, camera shake control means for calculating a movement correction angle for correcting an image blur caused by turning of the zoom lens detected by the camera shake detection means and sending a correction signal to make the zoom lens to a predetermined state in which a field of view is shifted by an amount corresponding to the movement correction angle, and a camera shake drive unit to make the zoom lens into the predetermined state based on the correction signal. The zoom lens includes a varifocal lens unit having a plurality of movable lens groups, and a prism disposed on an image side of the varifocal lens unit, wherein the prism has an incident plane on which a light flux from the varifocal lens unit enters, and an exit plane from which the light flux is emitted toward an image plane, the exit plane capable of being inclined with respect to an optical axis, wherein the camera shake drive unit receives the correction signal to incline the exit plane in accordance with a following conditional expression (1):

$$\alpha = -f \times \theta / [Bf(n-1)] \quad (1)$$

where $\alpha$ is an angle formed by a normal of the exit plane and the optical axis, f is a focus distance of a whole lens system, $\theta$ is a turning angle of a lens system, Bf is a distance from the exit plane of the prism to the image plane along the optical axis, and n is a refraction index of the prism.

According to another embodiment of the present invention, there is provided an imaging apparatus including a zoom lens, an imaging device converting an optical image formed by the zoom lens into an electric signal, camera shake detection means for detecting a turning angle of the zoom lens, camera shake control means for calculating a movement correction angle for correcting an image blur caused by turning of the zoom lens detected by the camera shake detection means and sending a correction signal to make the zoom lens to a predetermined state in which a field of view is shifted by an amount corresponding to the movement correction angle, and a camera shake drive unit to make the zoom lens into the predetermined state based on the correction signal. The zoom lens includes a varifocal lens unit having a plurality of movable lens groups, and a prism disposed on an image side of the varifocal lens unit, wherein the prism has an incident plane on which a light flux from the varifocal lens unit enters, and an exit plane from which the light flux is emitted toward an image plane, the incident plane capable of being inclined with respect to an optical axis, wherein the camera shake drive unit receives the correction signal to incline the incident plane in accordance with a following conditional expression (2):

$$\alpha = -f \times \theta / [(Bf + D/n) \times (n-1)] \quad (2)$$

where $\alpha$ is an angle formed by a normal of the incident plane with the optical axis, f is a focus distance of a whole lens system, $\theta$ is a turning angle of a lens system, Bf is a distance from the exit plane of the prism to the image plane along the optical axis, n is a refraction index of the prism, and D is a thickness of the prism.

Accordingly, in the imaging apparatus according to the embodiments described above, a deviation of the field of view caused by the tumbling of the lens system, which sometimes occurs at a shutter release, i.e. the so-called camera shake, can be corrected by inclining the exit plane or the incident plane of the prism, and the imaging apparatus can be configured to be small in shape.

In another embodiment of the present invention, the varifocal lens unit may include a front side lens group, an aperture diaphragm and a rear side lens group, which are arranged in order from an object side, and following conditional expressions (3) and (4) may be satisfied:

$$0.25 < \phi b / \phi < 0.8 \quad (3)$$

$$3 < Bf \times FNO / Ymax \quad (4)$$

where $\phi b$ is refractive power of the rear side lens group in a wide angle end, $\phi$ is refractive power of whole lens system in the wide angle end, Bf is a distance from the exit plane of the prism to the image plane along the optical axis, FNO is an F number in a telephoto end, and Ymax is a maximum image height. Consequently, the occurrence of a camera aberration and a trapezoid distortion at the time of inclining the exit plane or the incident plane can be more surely suppressed.

In another embodiment of the present invention, both of the front side lens group and the rear side lens group may severally include at least one or more lens groups each of which is movable when a lens position changes from the wide angle end to the telephoto end, and a following conditional expression (5) is satisfied:

$$0.4 < Ds/TL < 0.7 \quad (5)$$

Where Ds is a distance from the aperture diaphragm in the wide angle end to the image plane along the optical axis, and TL is a distance from a lens surface at a position nearest to the object side of the zoom lens in the wide angle end to the image plane along the optical axis. Accordingly, the occurrence of a coma aberration can be further suppressed, and the lens system can be made to be further smaller in size.

In another embodiment of the present invention, the prism may have a first parallel flat plate, a liquid and a second parallel flat plate, which are located in order from the object side. An object side lens surface of the first parallel flat plate may form the incident plane, and an image side lens surface of the second parallel flat plate may form the exit plane. Consequently, the variable apex angle prism can be easily configured.

In another embodiment of the invention, the prism may have a first lens and a second lens, which are located in order from the object side. An object side lens surface of the first lens may be a plane forming the incident plane, and an image side lens surface of the second lens may form the exit plane. An image side lens surface of the first lens and an object side lens surface of the second lens may be severally made of a curved surface having a same radius of curvature, the curved surfaces being slidably contacted with each other directly or with a friction reduction medium put between them. Accordingly, the variation of the apex angle per drive amount can be made to be small, and more accurate control is enabled.

DETAILED DESCRIPTION OF EMBODIMENTS

In the following, a zoom lenses and imaging apparatus according to an embodiment of the present invention will be described with reference to the attached drawings.

The zoom lens according to a first aspect of the present invention includes a varifocal lens unit having a plurality of movable lens groups, and a prism disposed on an image side of the varifocal lens unit, wherein the prism has an incident plane into which a light flux from the varifocal lens unit enters, and an exit plane from which the light flux is emitted toward an image plane, the exit plane capable of being inclined with respect to an optical axis, the exit plane inclined in accordance with a following conditional expression (1), $$\alpha = -f \times \theta / [Bf(n-1)] \tag{1}$$

Where

α: an angle formed by a normal of the exit plane and the optical axis, f: a focus distance of a whole lens system, θ: a turning angle of a lens system, Bf: a distance from the exit plane of the prism to the image plane along the optical axis, and N: a refraction index of the prism.

Moreover, the zoom lens according to a second aspect of the present invention includes a varifocal lens unit including a plurality of movable lenses, and a prism disposed on an image side of the varifocal lens unit, wherein the prism has an incident plane into which a light flux from the varifocal lens unit enters, and an exit plane from which the light flux is emitted toward an image plane, the incident plane capable of being inclined with respect to an optical axis, the incident plane being inclined in accordance with a following conditional expression (2), $$\alpha = -f \times \theta / [(Bf + D/n) \times (n-1)] \tag{2}$$

Where

α: an angle formed by a normal of the incident plane with the optical axis, f: a focus distance of a whole lens system, θ: a turning angle of a lens system, Bf: a distance from the exit plane of the prism to the image plane along the optical axis, n: a refraction index of the prism, and D: a thickness of the prism.

Because the prism is disposed on the image side of the lens system in each of the zoom lenses according to the first and the second aspects of the present invention, the prism angle of deviation necessary to correct the image movement depends on the focus distance of the lens.

In the zoom lens according to an aspect of the present invention, the lens is driven as follows in order to correct the image movement caused by the movement of a camera originating in a camera shake or the like.

When a movement angle of a camera, i.e. a turning angle of a lens system caused by the movement of the camera, is denoted by θ, an image movement amount, i.e. a deviation amount δy of a field of view on an image plane from a normal position can be calculated in accordance with an expression: δy=f×tan θ, where f denotes a focus distance.

Figure 25:
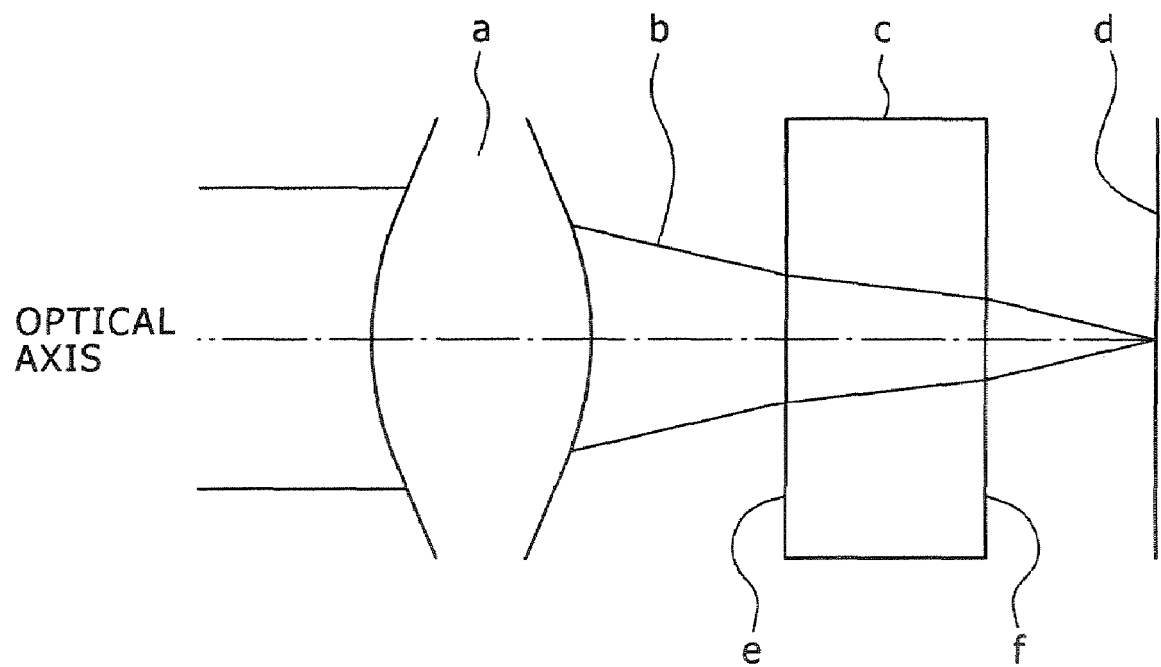
FIG. 25 is a view illustrating a conditional expression (1) together with FIG. 26, and the present view illustrates a state of exceeding an upper limit value.

The concept of the zoom lens according to an aspect of the present invention is shown in FIG. 25.

An on-axis light flux b having exited a zoom lens a transmits a prism c to reach an image surface d.

At this time, an incident plane e is supposed to be fixed, and an exit angle (the angle of deviation) α' when an exit plane f is inclined by an inclination angle α is given in accordance with an expression: α'=sin$^{-1}$(n×sin α)−α. By the transformation of the expression, sin(α'+α)=n×sin α. When both of the α and α' are supposed to be minute values, the following approximations is possible: sin(α'+α)≅(α'+α), sin α≅α. Consequently, the above expression can be transformed as α'+α=n×α. The exit angle α' can be calculated in accordance with α'=α(n−1).

When a distance from the exit plane f to the image surface d is denoted by Bf, an image shift δh can be expressed by an expression: δh=Bf×α'=Bf×α(n−1).

If an image movement δy caused by a movement of a camera is corrected by the image shift δh caused by an inclination of the exit plane f, the expression δy+δh=0 is true. When it is supposed that a movement angle θ of the camera is a minute value, the approximation of tan θ≅θ can be true. Consequently, f×θ+Bf×α(n−1)=0 is true.

Based on the above verification, it is known that in the zoom lens of the present invention the image movement caused by a movement of a camera can be corrected by inclining the exit plane f by the correction angle α expressed by the following conditional expression (1) when the camera has moved by the movement angle θ, $$\alpha = -f \times \theta / [Bf(n-1)]. \quad (1)$$

Moreover, in the zoom lens of another aspect of the present invention, the image shift δh becomes as follows based on the verification mentioned above if the incident plane e inclines by the inclination angle α and the exit plane f is fixed, $$\delta h = (Bf + D/n) \times \alpha(n-1)$$

where D denotes the thickness of the prism.

Consequently, if the image movement δy caused by the movement of the camera is corrected by the image shift δh caused by the inclination of the incident plane e, δy+δh=0 is true. If the movement angle θ of the camera is supposed to be a minute value, tan θ can be approximated as tan θ≅θ. Then, f×θ+(Bf+D/n)×α(n−1)=0 becomes true.

Based on the above verification, it is known that in the zoom lens according to the aspect of the present invention it becomes possible to correct the image movement caused by a movement of a camera by inclining the incident plane e by the correction angle α expressed by the following conditional expression (2) when the camera has moved by the movement angle θ:

$$\alpha = -f \times \theta / [(Bf + D/n) \times (n-1)]. \quad (2)$$

In addition, if the image movement caused by the movement of the camera is corrected by 100%, the exit plane f or the incident plane e may be inclined based on the conditional expression (1) or (2). However, because the image movement can be relaxed even if the image movement is not completely corrected, the image quality is improved. That is, even if the conditional expression (1) or (2) is not satisfied by 100%, some degree of effect can be expected.

As described above, when the variable apex angle prism is disposed in the optical system, there occurs an issue of the occurrence of a coma aberration, the change of a chromatic aberration, or the occurrence of a trapezoid distortion.

In the zoom lens according to an aspect of the present invention, the variable apex angle prism can be miniaturized by disposing the variable apex angle prism at a position nearest to the image side in the optical system. However, in order to acquire a better optical performance, it is necessary to perform the device of the optical system itself.

First, it is necessary that the exit pupil position is distant from the image surface, in a word a point where the principal ray reaches the image surface in the state of being nearly parallel to the optical axis.

In the zoom lens according to an aspect of the present invention, because the light flux passing through the variable apex angle prism is not a parallel light, a trapezoid distortion occurs when the angle formed by the principal ray with the optical axis. However, the inventors focused attention on a respect in which the exit pupil position is far from the image plane position in order to remove part of light flux, in which light intensity at marginal area becomes decreased and a user may feel unpleasant, by a microlens array when a subject image is recorded by the imaging device. As a result, the generating of a trapezoid distortion was suppressed.

A second respect of the device is that a coma aberration occurs when the apex angle is changed.

When the variable apex angle prism is disposed at a position nearest to the image side of the zoom lens, the variation of the apex angle for correcting the same amount of image movement becomes larger when the focus distance becomes larger. Consequently, the stop accuracy which is needed in case image movement is corrected does not depend on the focus distance of the zoom lens, and is fixed.

However, if a zoom ratio becomes larger, the variation of the apex angle becomes larger, and consequently an issue of being easy to generate a coma aberration occurs.

The zoom lens according to an aspect of the present invention is configured so that an image greatly shifts even if a small angle of deviation occurs by separating the distance from the variable apex angle prism to the image plane.

Because a coma aberration is generated when the inclination angle α becomes larger, it is important to set a distance L long in order to suppress the inclination angle α necessary to acquire a predetermined image shift amount. But, the elongation of the distance L brings about the enlargement in size.

The coma aberration amount depends on the F number (aperture ratio) of the zoom lens.

When the F number is denoted by FNO, the incident maximum angle θF into the incident plane of the on-axis light flux can be calculated in accordance with an expression: θF=tan$^{-1}$(1/2FNO).

At this time, when a ratio θF/α of the incident maximum angle θF to the inclination angle α of the prism becomes larger, the amount of the coma aberration becomes larger. Accordingly, the zoom lens according to an aspect of the present invention suppresses the comma aberration to be generated at the time of a change of the apex angle of the prism by setting the ratio θF/α small.

The concept of the zoom lens according to an aspect of the present invention is shown in FIG. 25.

The on-axis light flux b having exited the zoom lens a transmits the prism c to reach the image plane d.

At this time, when the incident plane e is supposed to be fixed and the exit plane f inclines by the inclination angle α [rad], an image shift δy is expressed by an expression: δy=L×α(n−1), where L is a distance from the exit plane f to the image plane d, and n is a refraction index of the prism c.

When the predetermined image shift δy is acquired, the inclination angle α can be made to be smaller by making the distance L longer.

Accordingly, in the zoom lens according to an aspect of the present invention, the distance L from the prism to the image plane is made to be longer as much as possible in the state where extreme enlargement in size is not caused.

By adopting the configuration mentioned above, the variable apex angle prism is disposed at the position nearest to the image side of the zoom lens to change the apex angle. Thereby the occurrence of the coma aberration and the trapezoid distortion caused at the time of shifting can be suppressed, and a better optical performance can be obtained.

The zoom lens according to an aspect of the present invention includes a front side lens group, an aperture diaphragm and a rear side lens group, all of which are arranged in order from the object side. When φb denotes the refractive power of the rear side lens group in the wide angle end sate, φ denotes the refractive power of the whole lens system in the wide angle end, Bf denotes a distance from the exit plane to the image plane along the optical axis, FNO denotes an F number in the telescopic end sate, and Ymax denotes the maximum image height, the zoom lens desirably satisfies the following conditional expressions (3) and (4), $$0.25 < b/\phi < 0.8 \quad (3)$$

$$3 < Bf \times FNO/Ymax. \quad (4)$$

The conditional expression (3) is one prescribing an exit pupil position.

Figure 26:
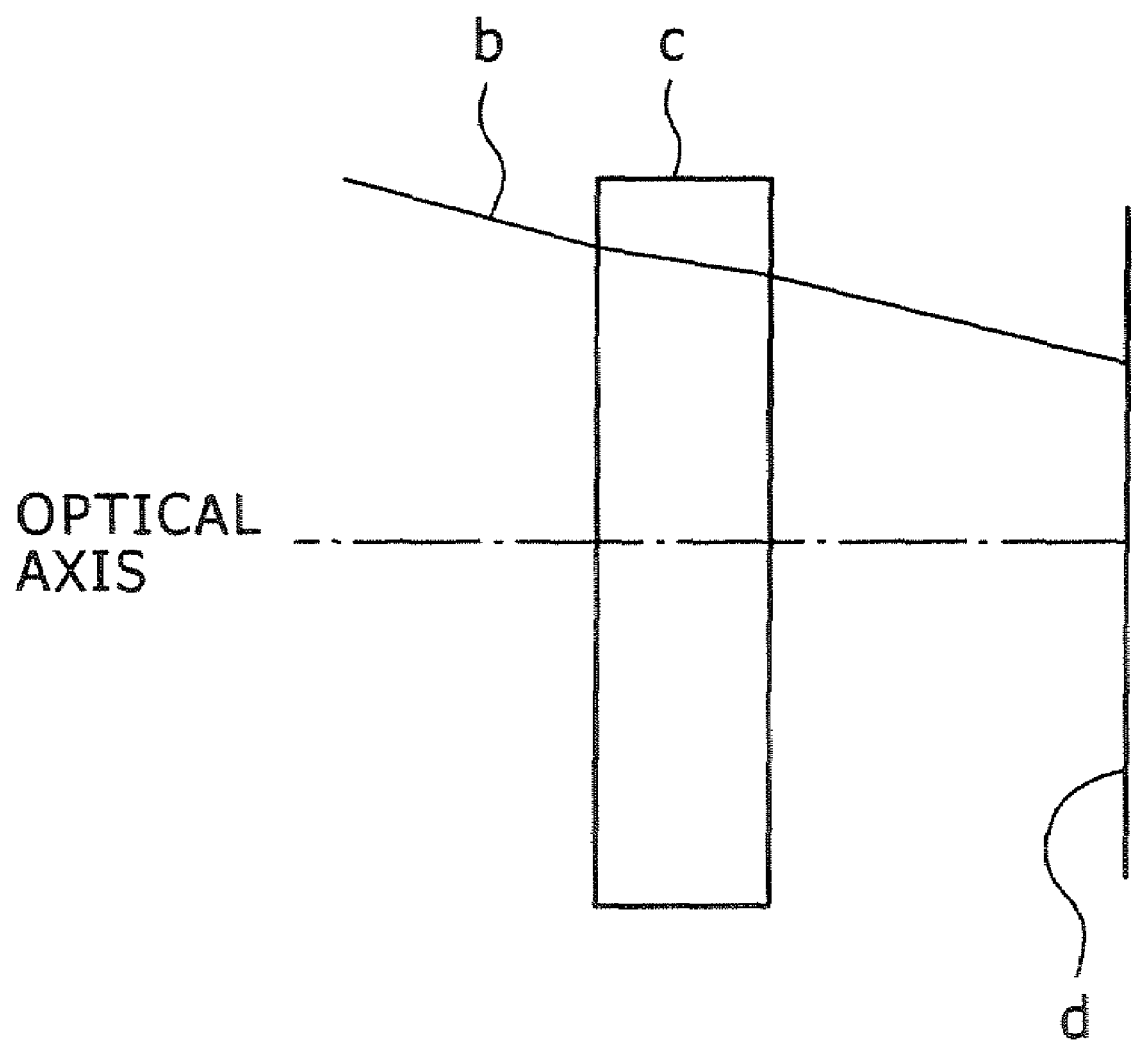
FIG. 26 is a view illustrating a conditional expression (1) together with FIG. 27, and the present view illustrates a state where exceeding an upper limit value.

When the exit pupil position exceeds the upper limit value of the conditional expression (3), the refractive power of the front side lens group is intensified toward the negative side. Consequently, the principal ray entering the prism enters the prism, approaching the optical axis, as shown in FIG. 26. Moreover, the incident angle thereof becomes larger. As a result, a trapezoid distortion occurs in a peripheral potion of a screen, which is not preferable.

Figure 27:
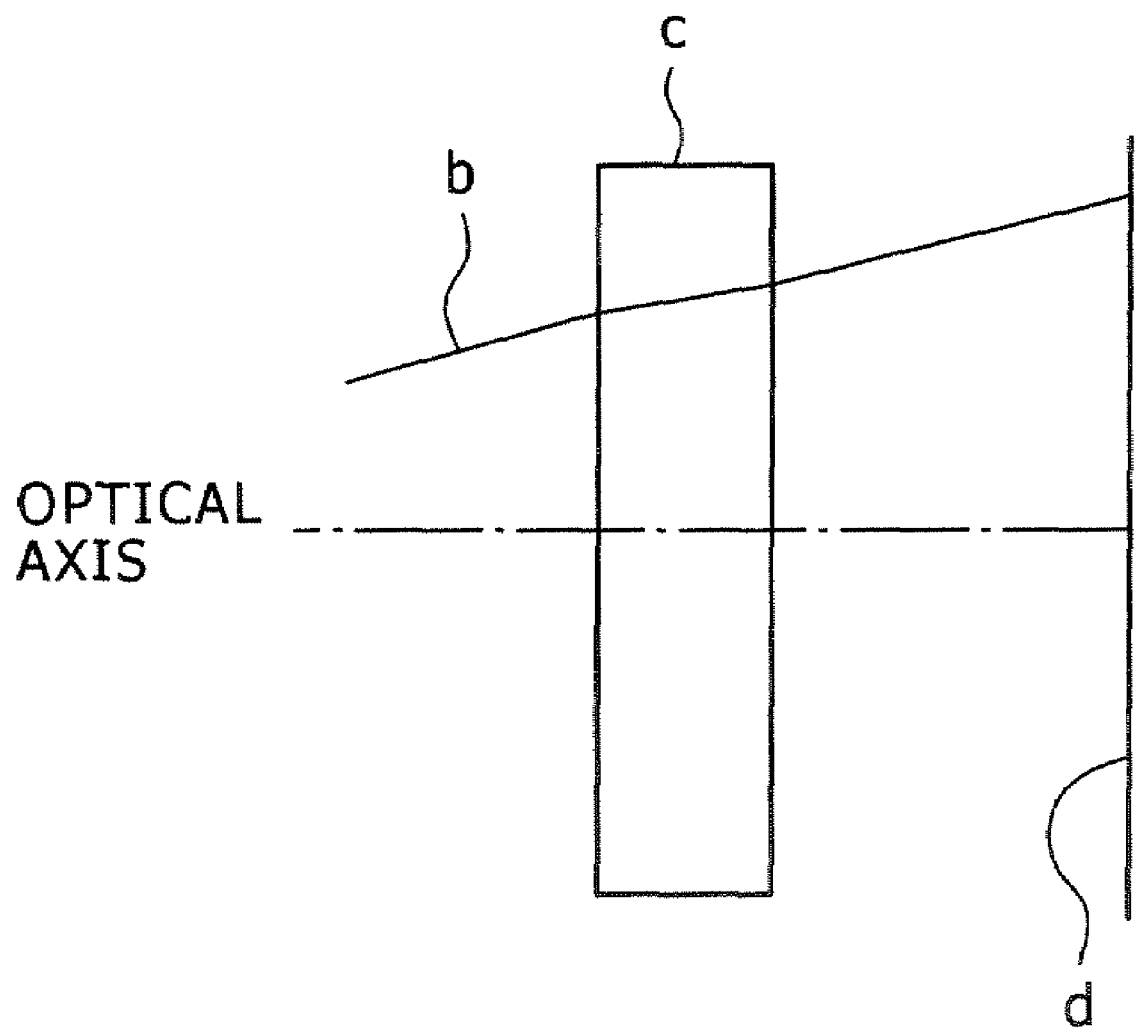
FIG. 27 is an explanatory illustration showing a state where falling below a lower limit.

When the exit pupil position adversely becomes less than the lower limit value, the refractive power of the rear side lens group is weakened. Consequently, as shown in FIG. 27, the principal ray entering the prism enters the prism, leaving the optical axis. Moreover, the incident angle thereof becomes larger. As a result, a trapezoid distortion occurs, which is not preferable. Moreover, because the light flux passing through the prism leaves the optical axis, enlargement of the prism diameter is brought about, and the situation would run count of the sprit of the zoom lens according to an aspect of the present invention.

The conditional expression (4) is one prescribing a back-focus.

Because the back-focus becomes shorter when the back-focus becomes less than the lower limit value of the conditional expression (4), the angle of deviation of the prism which is needed to shift an image by a predetermined amount becomes larger. As a result, it becomes difficult to well suppress a change of the coma aberration generated at the time of shifting the image.

In addition, it is more preferable to set the upper limit value of the conditional expression (4) to 12 in the zoom lens according to an aspect of the present invention. If the back-focus becomes too long, the whole size of the lens system becomes too large, which is not preferable.

In the zoom lens according to an aspect of the present invention, it is desirable that both of the front side lens group and the rear side lens group includes at least one or more lens groups movable when the lens position changes from the wide angle end to the telephoto end, and that the zoom lens satisfies the following conditional expression (5) in order to attain the balance between the reduction of lens diameters and the enhancement of performances, $$0.4 < Ds/TL < 0.7 \quad (5)$$

where Ds is a distance from the aperture diaphragm in the wide angle end to the image plane along the optical axis, and TL is a distance from the lens surface at the position nearest to the object side of the zoom lens in the wide angle end to the image plane along the optical axis.

In the zoom lens, it is effective to positively change the height of the off-axis light flux which passes through each lens group in order to correct the change of an off-axis aberration accompanying a change of an angle of view. In particular, when the zoom lens disposes movable lens groups both on the object side and the image side with the aperture diaphragm put between both the sides, it is possible to well correct the change of the off-axis aberration occurring at the time when the lens positional sate changes from the wide angle end, in which the focus distance is the shortest, to the telephoto end, in which the focus distance is the longest.

Moreover, if the movable lens group exists only on the object side of the aperture diaphragm, the aperture diaphragm position moves to the image side due to availability of space for the movable lens group. As a result, because the off-axis light flux which passes through the lens group disposed at a position distant from the aperture diaphragm leaves the optical axis, reduction of the lens diameter cannot be fully attained. Similarly, when the movable lens group exists only on the image side of the aperture diaphragm, reduction of the lens diameter cannot be fully attained.

Accordingly, in order to cope with both the miniaturization of the lens diameter and the further enhancement of the performance in the zoom lens according to an aspect of the present invention, it is desirable for both of the front side lens group and the rear side lens group to have at least one or more movable lens groups.

The conditional expression (5) is the one which prescribes the position of the aperture diaphragm in a lens system.

When the ratio Ds/TL is less than the lower limit value of the conditional expression (5), the off-axis light flux which passes through the lens group disposed at a position nearest to the object side leaves the optical axis, and it becomes impossible to fully attain the miniaturization of the lens diameter in the wide angle end.

When the ratio Ds/TL exceeds the upper limit value of the conditional expression (5), the off-axis light flux passing through the rear side lens group leaves the optical axis so that the coma aberration occurs greatly in the peripheral portion of the screen to make it difficult to acquire a predetermined optical performance.

The (variable apex angle) prisms which can be used for the zoom lenses according to the aspects of the present invention are shown in FIGS. 19 and 20, and FIGS. 21 and 22.

Figure 19:
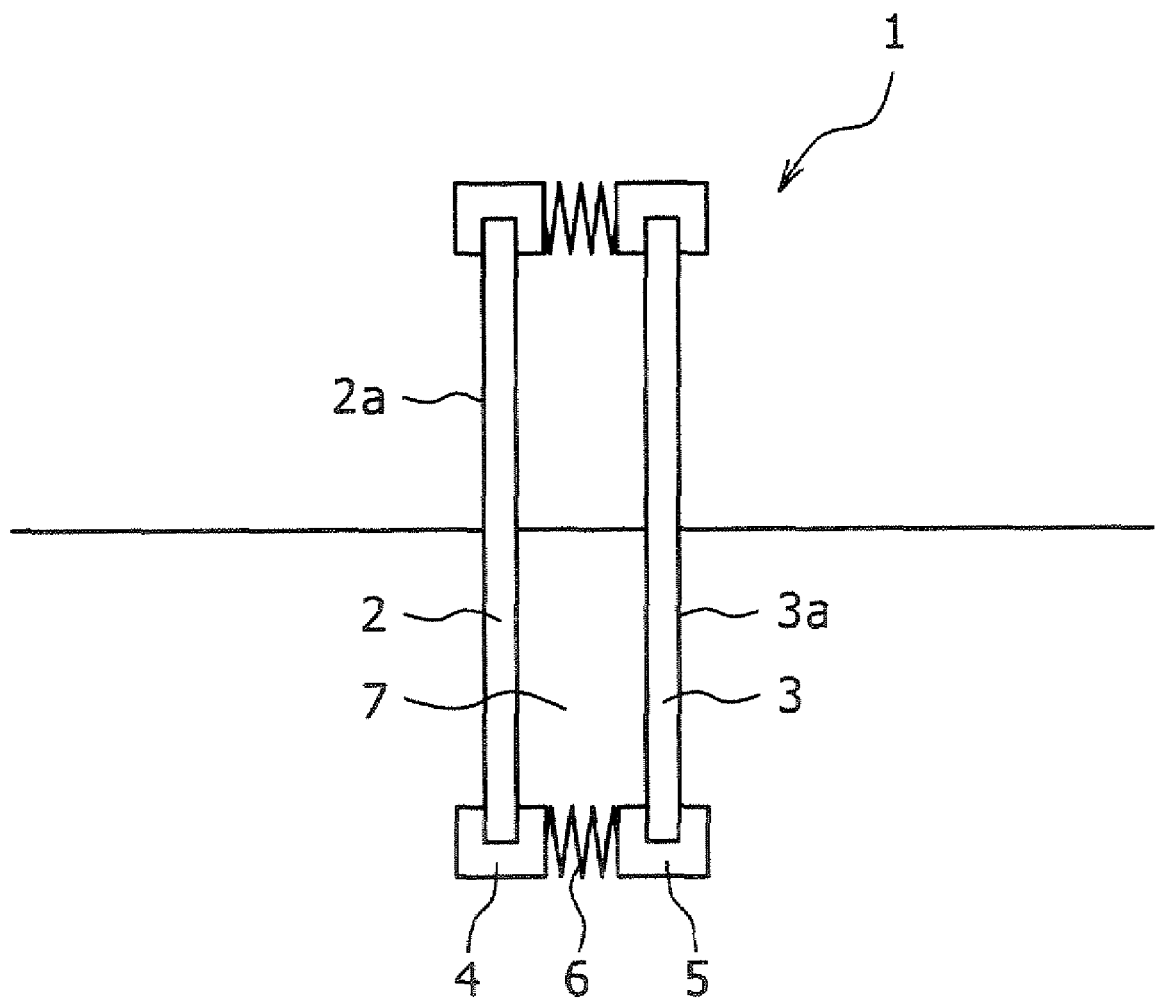
FIG. 19 shows a concrete example of a prism together with FIG. 20, and the present view is a schematic sectional view.
Figure 20:
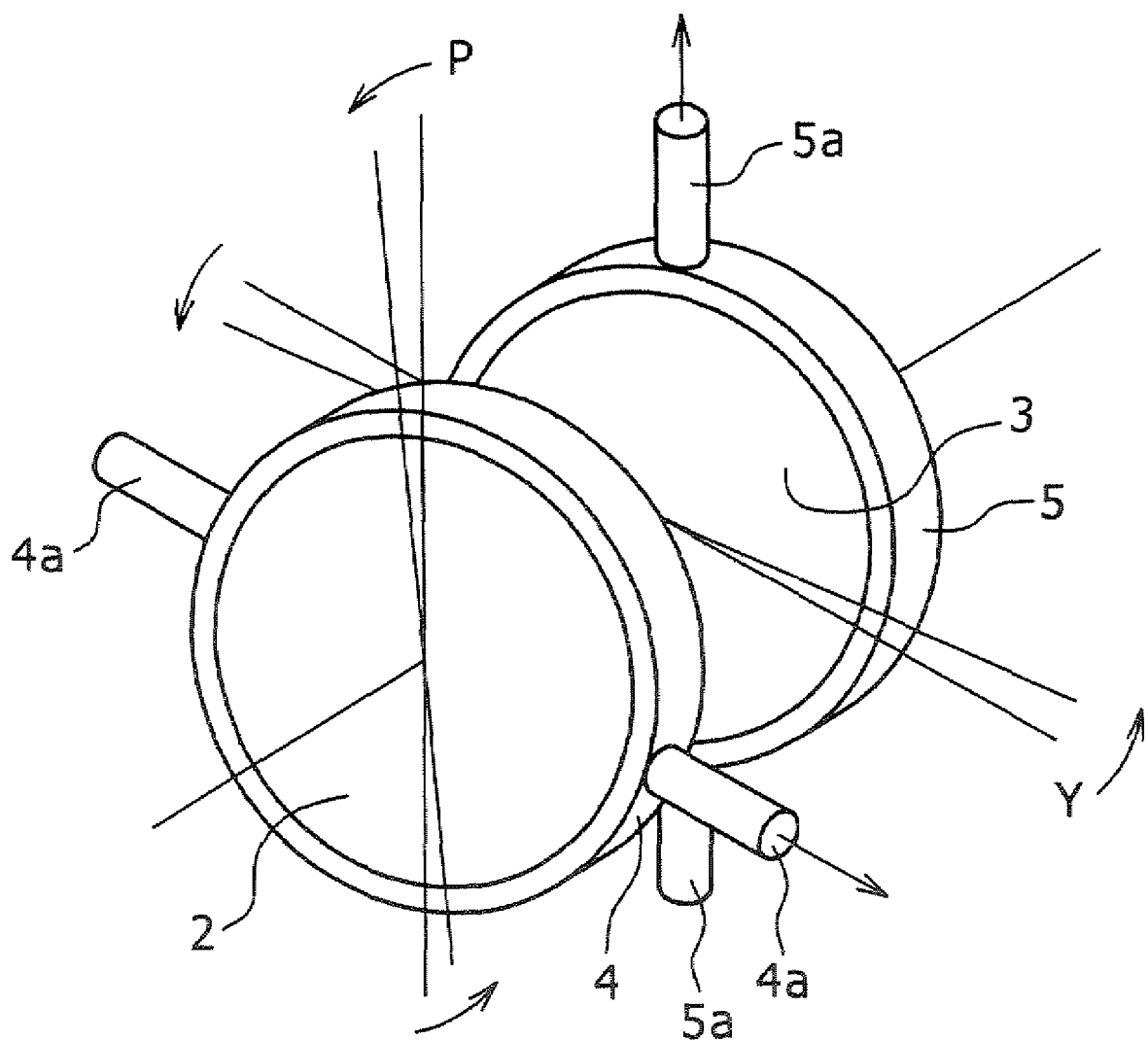
FIG. 20 is a partially omitted schematic perspective view.

The prism 1 shown in FIGS. 19 and 20 includes two transparent parallel flat plates 2 (a first parallel flat plate) and 3 (a second parallel flat plate), the circumferences of which are held with frames 4 and 5, respectively, a seal gum 6 shaped in bellows to seal the space between the circumferences of the frames 4 and 5, and a liquid 7 enclosed in a space sealed hermetically by the two parallel flat plates 2 and 3, the frames 4 and 5, and the seal gum 6. An object side surface 2a of the first parallel flat plate 2 is used as the incident plane, and the image side surface 3a of the second parallel flat plate 3 is used as the exit plane. Shafts 4a project from the frame 4 into a horizontal direction, and shafts 5a project from the frame 5 into a vertical direction.

For example, a glass plate can be used as each of the parallel flat plate 2 and 3. Moreover, a liquid having sufficient transmittance in a visible light region and having the uniformity of the transmittance, such as water, glycerol, silicone oil and the like, can be used as the liquid 7. Moreover, as long as a gel material satisfies the conditions mentioned above, the gel material such as silicone gel and the like can be also used. In addition, it is needless to say that the concrete materials are not limited to those mentioned here.

The frame 4 is rotatably supported around the shafts 4a, and the frame 5 is rotatably supported around the shafts 5a. When the frame 4 is inclined, the parallel flat plate 2 supported by the frame 4 is inclined in the direction of an arrow P. Thereby, the imaging region is shifter in the vertical direction. Moreover, when the frame 5 is inclined, the parallel flat plate 3 is inclined in the direction of an arrow Y. Thereby, the imaging region is shifted in the horizontal direction. Accordingly, by selecting the inclination directions and the angles of the frames 4 and 5, the imaging region can be shifted in all directions around the optical axis.

Figure 21:
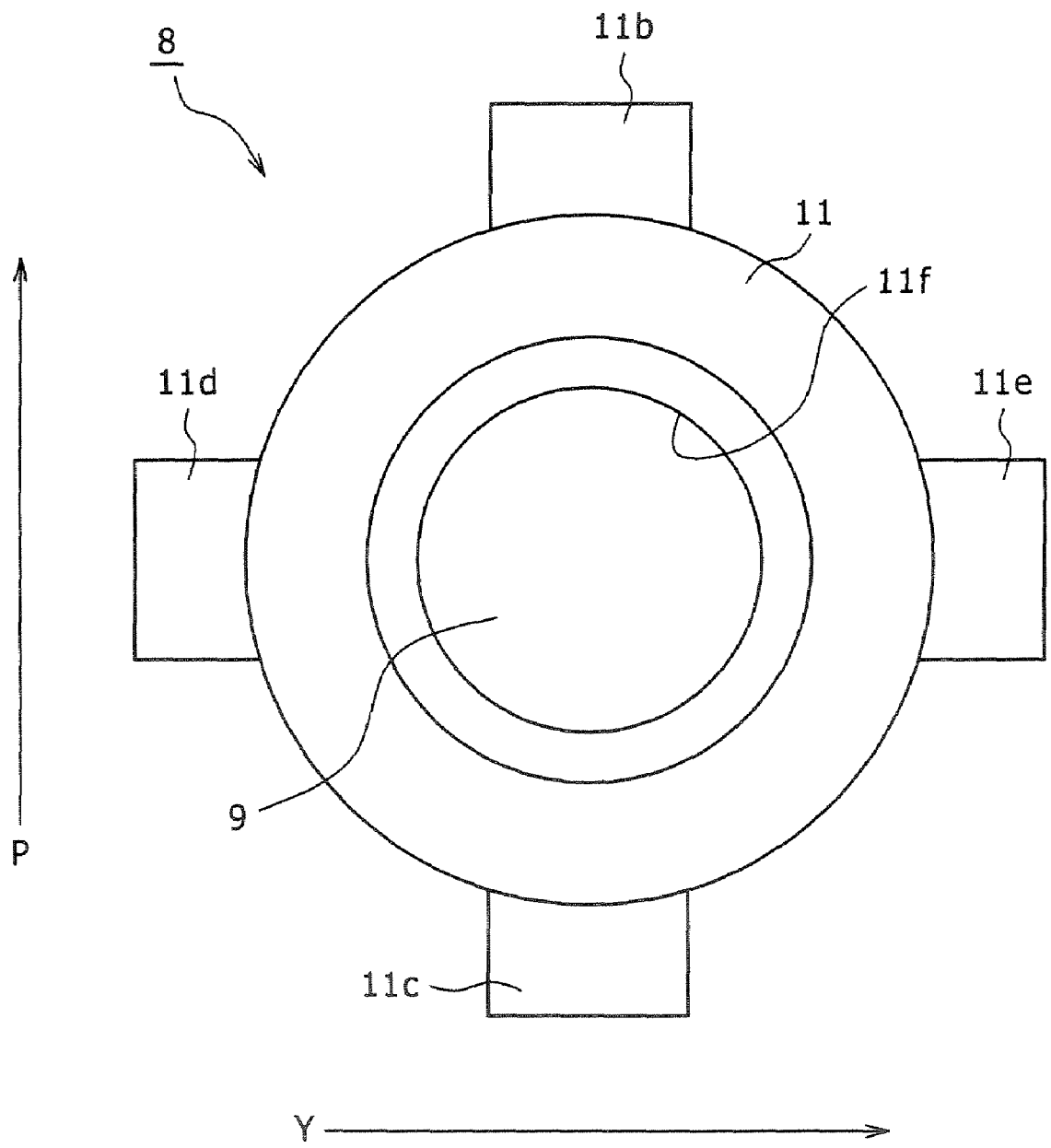
FIG. 21 shows another concrete example of the prism together with FIG. 22, and the present view is a schematic front view.
Figure 22:
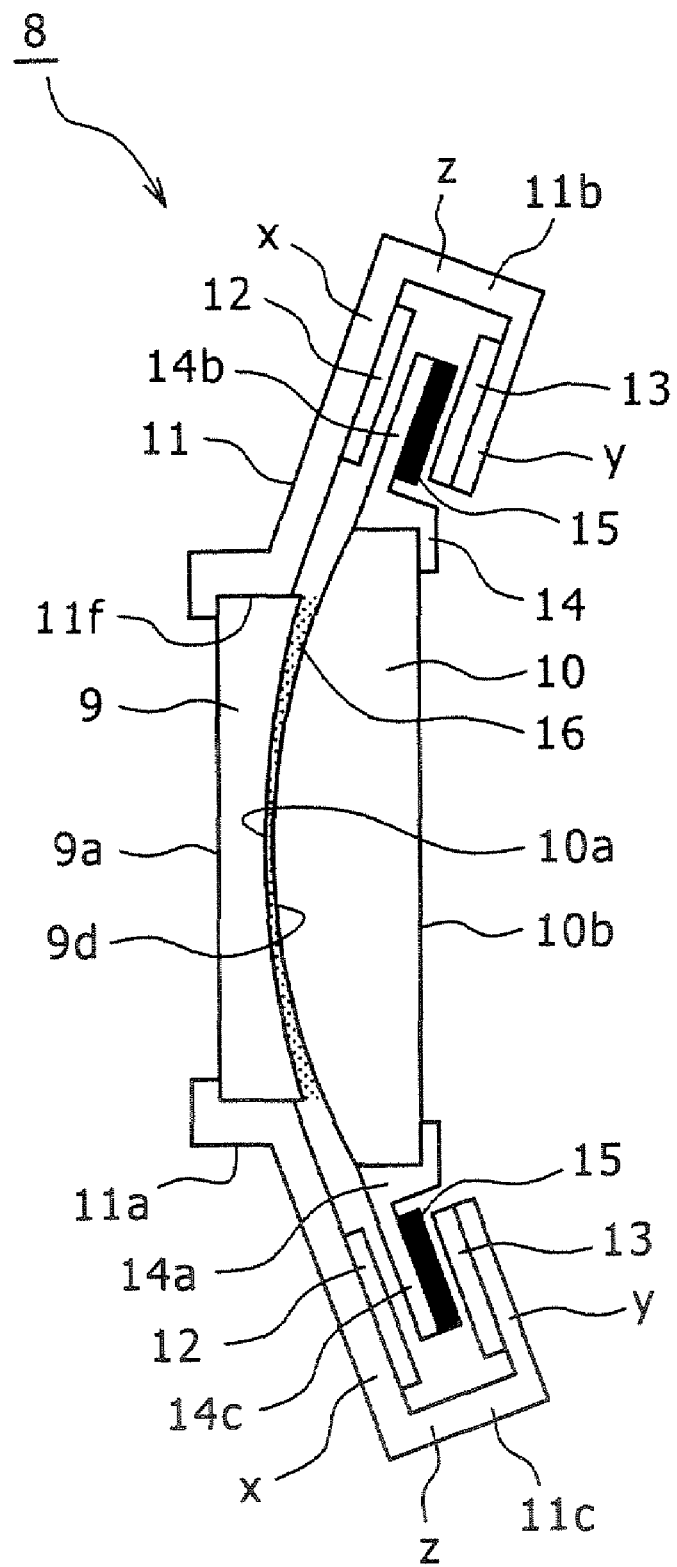
FIG. 22 is a longitudinal sectional view at the center of the front view of FIG. 21.

A prism 8 shown in FIGS. 21 and 22 includes a plane-concave lens 9 (a lens having an object side lens surface 9*a* being a plane and an image side lens surface 9*b* being a concave surface) as the first lens and a convex-plane lens 10 (a lens having an object side lens surface 10*a* being a convex surface and an image side lens surface 10*b* being a plane) as the second lens, the first and the second lenses combined with each other. The concave surface 9*b* of the plane-concave lens 9 and the convex surface 10*a* of the convex-plane lens 10 have severally almost the same radius of curvature. The prism 8 is configured to have a structure of adhering against the lenses 9 and 10 to each other closely in a state of disposing the planes 9*a* and 10*b* on the outside and the curved sides 9*b* and 10*a* on the inside. In the prism 8, the angle between the planes 9*a* and 10*b* is changed by fixing the plane-concave lens 9 and shifting the convex-plane lens 10 along the curved surfaces 9*b* and 10*a*.

The two lenses 9 and 10 are supported by a housing 11. The housing 11 includes a main portion 11*a* shaped in a circle when it is viewed from the front thereof, and four drive portions 11*b*, 11*c*, 11*d* and 11*e* projecting from the left, right, top and bottom of the main portion 11*a* to the outside, the main portion 11*a* and the drive portions 11*b*-11*e* formed in one body.

A circular attachment hole 11*f* having a diameter somewhat smaller than the external form of the main portion 11*a* is formed on the front side of the main portion 11*a*. The plane-concave lens 9 is held in the attachment hole 11*f*.

Each of the drive portions 11*b*-11*e* of the housing 11 includes a front surface potion x, a rear surface portion y and a connection portion z connecting the front surface portion x and the rear surface portion y at the outer end. A magnet 12 is fixed on the inner surface of the front surface portion x of each of the drive portions 11*b*-11*e*, and a yoke 13 is fixed on the inner surface of the rear surface portion y of each of the drive portions 11*b*-11*e* to be opposed to the magnet 12.

The convex-plane lens 10 is held by a lens holding frame 14.

The lens holding frame 14 includes a circular frame 14*a*, and four coil holding portions 14*b*, 14*c*, 14*x* and 14*x* (only top and bottom ones 14*b* and 14*c*, respectively, are shown in FIG. 22) projecting from the left, right, top and bottom of the frame 14*a* to the outside. The convex-plane lens 10 is held by the frame 14*a*, and a (moving) coil 15 is supported on the rear surface of each of the coil holding units 14*b*-14*x*.

In the lens holding frame 14, the four coil holding portions 14*b*-14*x* are inserted into the drive portions 11*b*-11*e* of the housing 11, and thereby the coil 15 is located between the magnet 12 and the yoke 13 in each of the drive portions 11*b*-11*e*. Then, the object side surface (convex surface) 10*a* of the convex-plane lens 10 are set to be in a state of being almost contacted with the image side surface (concave surface) 9*b* of the plane-concave lens 9, and an oil 16 intervenes between the two surfaces 9*b* and 10*a* as a medium to reduce the friction between them.

In the prism 8, the lens holding frame 14 moves to the upper, lower, right and left sides in a predetermined range according to the existence of current to the coils 15 held in the coil holding portions 14*b*-14*x* of the lens holding frame 14 and the direction of the current. When the direction of the current is one causing the absorption by the magnetic field formed between the magnet 12 and the yoke 13 (hereinafter referred to as "absorption direction") in the case where the current is provided to the coil 15 of the coil holding portion 14*b* on the upper side of the lens holding frame 14, for example, the lens holding frame 14 is moved upward so that the coil 15 is located in the magnetic field. When the direction of the current is one causing repulsion to the magnetic field formed between the magnet 12 and the yoke 13 (hereinafter referred to "repulsion direction"), the lens holding frame 14 is moved downward so that the coil 15 goes out of the magnetic field.

Consequently, when the currents with the same direction are provided to all of the coils 15 held by the four coil holding portions 14*b*-14*x* held by the lens holding frame 14, the lens holding frame 14 is held in the neutral state shown in FIG. 22. Then, the convex-plane lens 10 held by the lens holding frame 14 is located so that the optical axis thereof agrees with the optical axis of the optical system.

For example, when the current in the absorption direction is provided to the coil 15 of the coil holding portion 14*b* on the upper side and no current is provided to the other coils 15 or the current in the repulsion direction is provided to the other coils 15, the lens holding frame 14 (the convex-plane lens 10 as a result) is moved upward. When the current in the absorption direction is provided to the coil 15 of the coil holding portion 14*c* on the lower side and no current is provided to the other coils 15 or the current in the repulsive direction is provided to the other coils 15, the lens holding frame 14 (the convex-plane lens 10 as a result) is moved downward. Similarly, the current in the absorption direction is provided to only the coil 15 of the left side coil holding portion 14*x* or the right side coil holding portion 14*x* and no current is provided to the other coils 15 or the current in the repulsion direction is provided to the other coils 15, the lens holding frame 14 (the convex-plane lens 10 as a result) is moved toward the left side or the right side, respectively.

When the current in the absorption direction is provided to the coils 15 of the coil holding portions 14*b* and 14*x* on the upper side and the left side, respectively, and no current is provided to the other coils 15 or the current in the repulsive direction is provided to the other coils 15, the lens holding frame 14 (the convex-plane lens 10 as a result) is moved toward the upper left side. When the current in the absorption direction is provided to the coils 15 of the coil holding portions 14*c* and 14*x* on the lower side and the right side, respectively, and no current is provided to the other coils 15 or the current in the repulsive direction is provided to the other coils 15, the lens holding frame 14 (the convex-plane lens 10 as a result) is moved toward the lower right side.

As described above, it is possible to adjust the amount of movement in each direction by adjusting the amount of current provided to each of the coils 15 held by the four coil holding portions 14*b*, 14*c*, 14*x* and 14*x*. Accordingly, it is possible to move the lens holding frame 14 (the convex-plane lens 10 as a result) into an arbitrary direction among the directions of 360 degrees around the optical axis of the optical system by a necessary distance by adjusting the direction and amount of the current into each of the coils 15 of the four coil holding portions 14*b*, 14*c*, 14*x* and 14*x*.

Then, because the object side surface 10*a* of the convex-plane lens 10 moves along the image side surface 9*b* of the plane-concave lens 9, the angle formed between the object side surface (incident plane) 9*a* of the plane-concave lens 9 and the image side surface (exit plane) 10*b* of the convex-plane lens 10, i.e. the apex angle, is changed. Consequently, the light flux having entered the incident plane 9*a* in parallel to the optical axis of the optical system is emitted from the exit plane 10*b* with an angle to the optical axis of the optical system except for the case where the incident plane 9*a* and the exit plane 10*b* are opposed to each other in parallel, namely when the prism 8 has an apex angle. Accordingly, by forming an inclination between the incident plane 9*a* and the exit plane 10*b*, the field of view can be shifted into the direction almost perpendicular to the optical axis of the optical system in the direction and by the amount according to the apex angle based on the inclination. In addition, it is also possible to use the plane 10b of the convex-plane lens 10 as the incident plane and to use the plane 9a of the plane-concave lens 9 as the exit plane. In addition, even if a prism is a variable apex angle prism other than the prisms shown in FIGS. 19-22, the prism can be used for the zoom lens of the present embodiment.

Figure 23:
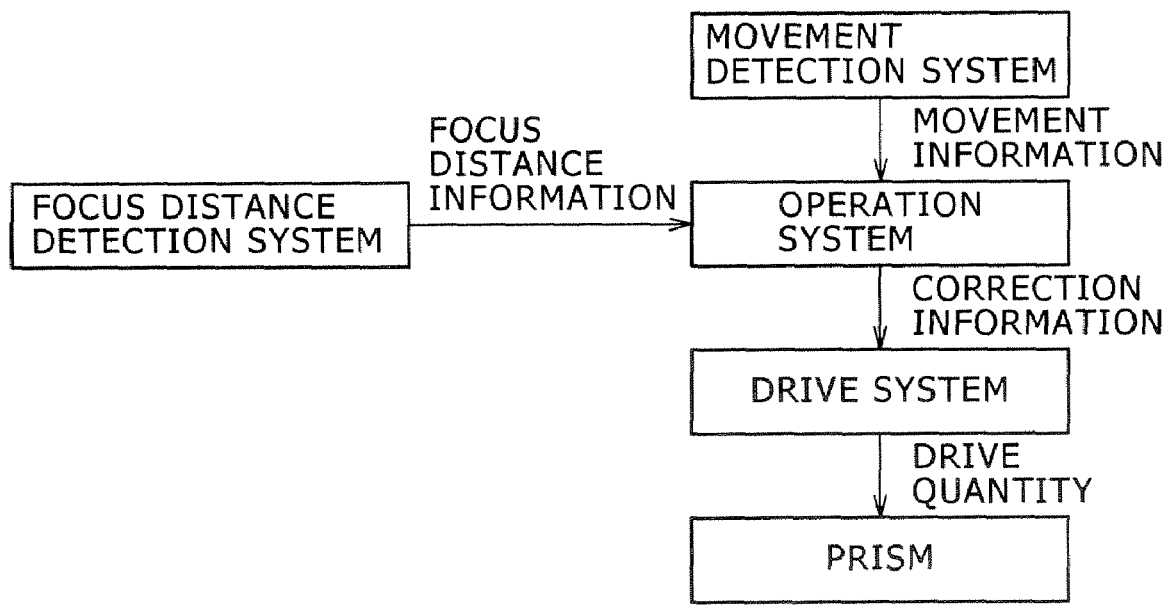
FIG. 23 is a diagram showing an example of the flow of an image movement correction by the zoom lens.

A flow relative to a vibration-proof operation in the zoom lens according to an aspect of the present invention is shown in FIG. 23.

A correction amount necessary to correct a camera shake by an operation system based on movement information output from a movement detection system and focus distance information output from a focus distance detection system is calculated based on coefficients stored in an operation system in advance. The correction amount is given to a drive system as correction information, and a drive amount is given to a prism by the drive system.

An angular velocity sensor is used as the movement detection system, and detects the angular velocities in two opposing directions independently. The focus distance detection system outputs information that can be converted into a focus distance based on a lens drive amount from a reference position or an amount of movement that can be converted to the lens drive amount (such as the directions and quantities of the currents to be supplied to the four coils 15 at the time of using the prism 8 mentioned above).

In the following, the embodiments of the zoom lens of the present invention and numerical value examples in which concrete numerical values are applied to each of the embodiments will be described with reference to FIGS. 1-18 and Tables 1-15.

In addition, the aspherical surface forms adopted in each numerical value example is expressed by the following formula 1.

$$x = cy^2/(1+(1-(1+\kappa)c^2y^2)^{1/2}) + Ay^4 + By^6 + \ldots \quad \text{[Formula 1]}$$

where y denotes a height from an optical axis, x denotes a sag amount, c denotes a curvature, κ denotes a conical constant, A, B, . . . denote aspherical surface coefficients.

Figure 1:
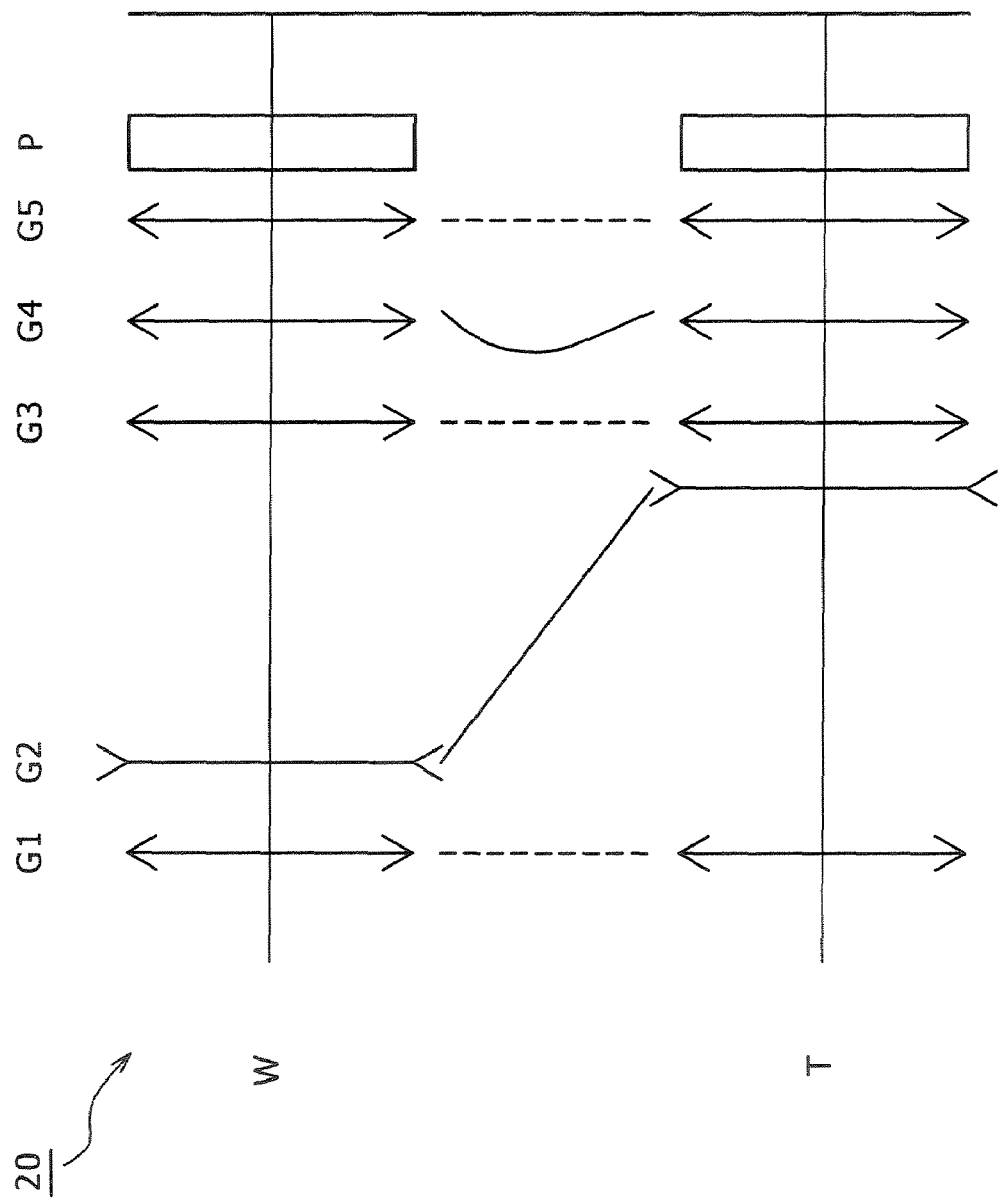
FIG. 1 is a diagram showing a refractive power arrangement of a zoom lens according to a first embodiment, and the capability of movement and a locus of the movement of each lens group at the time of magnification change.

FIG. 1 shows a refractive power arrangement of a zoom lens 20 according to a first embodiment. A first lens group G1 having positive refractive power, a second lens group G2 having negative refractive power, a third lens group G3 having positive refractive power, a fourth lens group G4 having positive refractive power, a fifth lens group G5 having positive refractive power and a prism P are arranged in order from an object side. When the magnification is changed from a wide angle end to a telephoto end, the second lens group G2 moves to an image side so that the air space between the first lens group G1 and the second lens group G2 increases and the air space between the second lens group G2 and the third lens group G3 decreases. At this time, the first lens group G1, the third lens group G3, the fifth lens group G5 and the prism P are fixed, and the fourth lens group G4 moves in order to correct the change of an image plane position caused by the movement of the second lens group G2 and moves to the object side at the time of short distance focusing.

Figure 2:
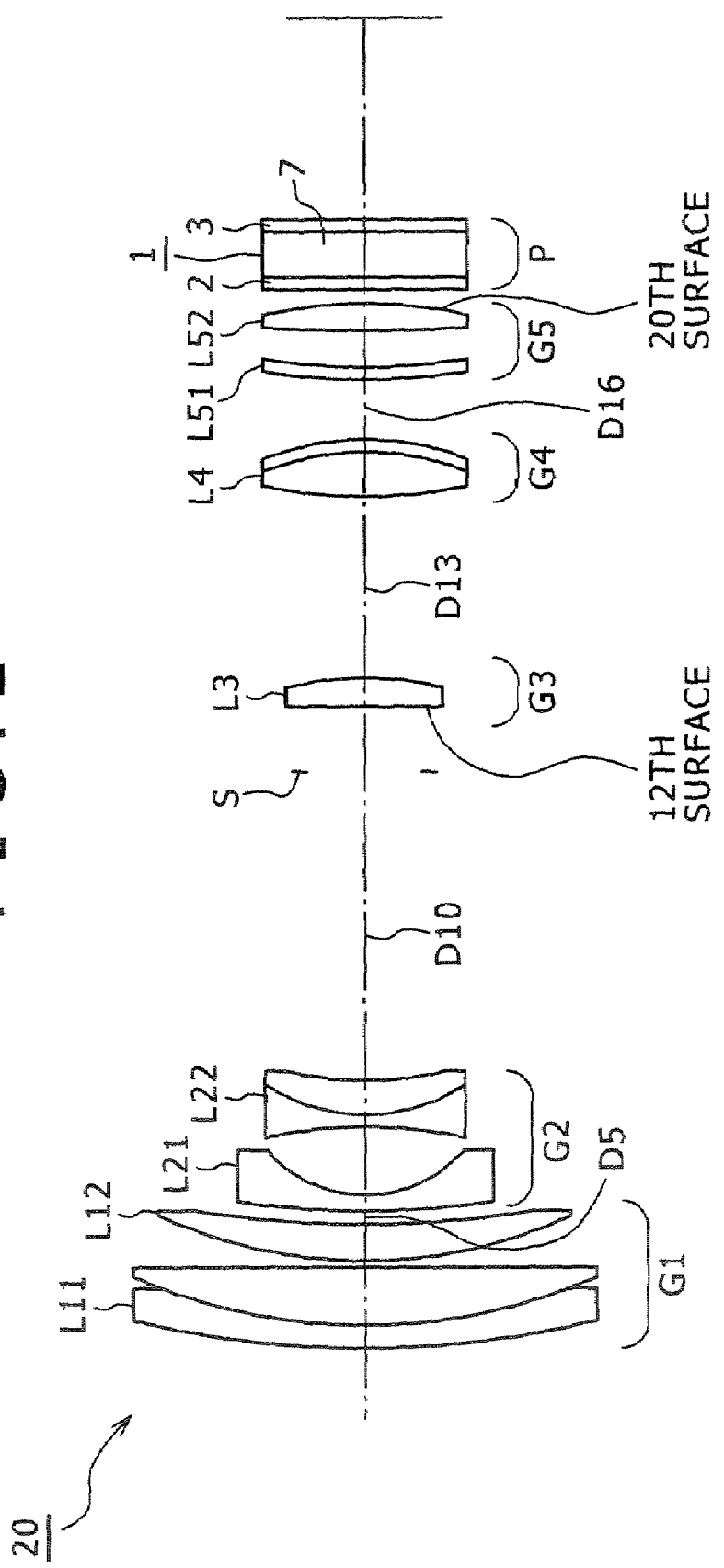
FIG. 2 is a view showing the lens configuration of the zoom lens according to the first embodiment.

FIG. 2 is a view showing the lens configuration of the zoom lens 20 according to the first embodiment, and each lens group is configured as follows.

The first lens group G1 includes a cemented lens L11 of a negative lens having a convex surface facing the object side and being shaped in the meniscus form, and a positive lens having a convex surface facing the object side; and a positive lens L12 having a convex surface facing the object side. The second lens group G2 includes a negative lens L21 having a concave surface facing the image side and being formed in the meniscus form; and a cemented lens L22 of a negative lens formed in a biconcave form and a positive lens having a convex surface facing the objective side and being formed in the meniscus form. The third lens group G3 includes a positive lens L3 formed in a biconvex form. The fourth lens group G4 includes a cemented positive lens L4 of a positive lens formed in a biconvex form and a negative lens having a concave surface facing the object side and being formed in the meniscus form. The fifth lens group G5 includes a negative lens L51 having a concave surface facing the image side and a biconvex lens L52. The prism P is designated by numeral 1 and has a structure shown in FIGS. 19 and 20.

In addition, an aperture diaphragm S is disposed at a position near to the object side of third lens group G3, and is fixed when changing the magnification.

The values of the specifications of the numerical value example 1 in which concrete numerical values are applied to the first embodiment is shown in Table 1. In addition, the surface number in the following specification tables indicates an $i^{th}$ surface from the object side, a radius of curvature indicates the on-axis radius of curvature of the surface, a refraction index indicates the value to the d line (λ=587.6 nm) of the surface, an Abbe number indicates the value to the d line of the surface, f indicate a focus distance, FNO indicates an F number, and 2ω indicates an angle of view. Moreover, a radius of curvature 0 indicates a plane.

TABLE 1

| f | 8.14~38.32 |
| F N0 | 2.88~3.24 |
| 2 ω | 60.60~13.27° |

| SURFACE NUMBER | RADIUS OF CURVATURE | SURFACE INTERVAL | REFRACTION INDEX | ABBE NUMBER |
|---|---|---|---|---|
| 1: | 58.0469 | 1.200 | 1.92286 | 20.9 |
| 2: | 31.8566 | 3.472 | 1.77250 | 49.6 |
| 3: | 385.6446 | 0.200 | | |
| 4: | 26.5423 | 2.557 | 1.69680 | 55.3 |
| 5: | 72.1279 | (D5) | | |
| 6: | 72.1279 | 0.600 | 1.88300 | 40.8 |
| 7: | 7.7200 | 4.387 | | |
| 8: | −31.7152 | 0.500 | 1.49700 | 81.6 |
| 9: | 9.1943 | 2.299 | 1.90366 | 31.1 |
| 10: | 30.4291 | (D10) | | |
| 11: | 0.0000 | 4.000 | | (APERTURE DIAPHRAGM) |
| 12: | 85.6791 | 1.335 | 1.76802 | 49.3 |
| 13: | −43.0892 | (D13) | | |
| 14: | 33.2563 | 2.706 | 1.49700 | 81.6 |
| 15: | −14.3230 | 0.500 | 1.94595 | 18.0 |
| 16: | −19.0368 | (D16) | | |
| 17: | 36.0011 | 0.500 | 1.94595 | 18.0 |
| 18: | 25.0000 | 2.546 | | |
| 19: | 100.0000 | 1.249 | 1.62041 | 60.3 |
| 20: | −30.7532 | 1.000 | | |
| 21: | 0.0000 | 0.500 | 1.51680 | 64.2 |
| 22: | 0.0000 | 3.000 | 1.51341 | 61.2 |
| 23: | 0.0000 | 0.500 | 1.51680 | 64.2 |
| 24: | 0.0000 | (Bf) | | |

A $12^{th}$ surface and a $20^{th}$ surface are formed as aspherical surfaces. Then, the $4^{th}$, the $6^{th}$, the $8^{th}$ and the $10^{th}$ aspherical surface coefficients A, B, C and D of these surfaces in the numerical value example 1 are shown in Table 2 together with the conical constants κ. In addition, in the Table 2 and the following tables showing aspherical surface coefficients, "E-i" indicates an exponential expression using 10 as a base, i.e. "$10^{-i}$", and for example "0.26029E-05" expresses "$0.26029 \times 10^{-5}$."

TABLE 2

| 12TH SURFACE | κ = −2.195038  D = +0.749312E−09 | A = −0.328381E−04 | B = +0.772945E−06 | C = −0.452069E−07 |
| 20TH SURFACE | κ = 0.000000  D = −0.418081E−09 | A = +0.512475E−04 | B = −0.870496E−06 | C = +0.335183E−07 |

When a lens position arrangement changes from the wide angle end to the telephoto end, a surface interval D5 between the first lens group G1 and the second lens group G2, a surface interval D10 between the second lens group G2 and the aperture diaphragm S, a surface interval D13 between the third lens group G3 and the fourth lens group G4, and a surface interval D16 between the fourth lens group G4 and the fifth lens group G5 change. Accordingly, each of the surface intervals mentioned above and back-foci BF in the wide angle end sate (f=8.143) and the telephoto end (f=38.317) in the numerical value example 1 are shown in Table 3.

TABLE 3

(VARIABLE INTERVAL TABLE)

| f | 8.143 | 38.317 |
|---|---|---|
| D5 | 0.900 | 17.980 |
| D10 | 18.881 | 1.801 |
| D13 | 11.469 | 6.016 |
| D16 | 3.865 | 9.288 |
| Bf | 12.127 | 12.127 |

In the following Table 4, the inclination angles of the incident plane and the exit plane of a prism necessary to correct the image movement of 0.5 degrees in each of the wide angle end (f=8.143) and the telephoto end (f=38.317) in the numerical value example 1 are shown.

TABLE 4

| f | 8.143 | 38.317 |
|---|---|---|
| INCIDENT PLANE | 0.652 DEGREES | 3.060 DEGREES |
| EXIT PLANE | 0.652 DEGREES | 3.060 DEGREES |

Corresponding values of φb, Ymax and each of the conditional expressions (3)-(5) in the numerical value example 1 are shown in Table 5.

TABLE 5

φb = 0.051
Ymax = 4.55
(1) φb/φ = 0.415
(2) Bf · FN0/Ymax = 8.635
(3) Ds/TL = 0.564

Figure 3:
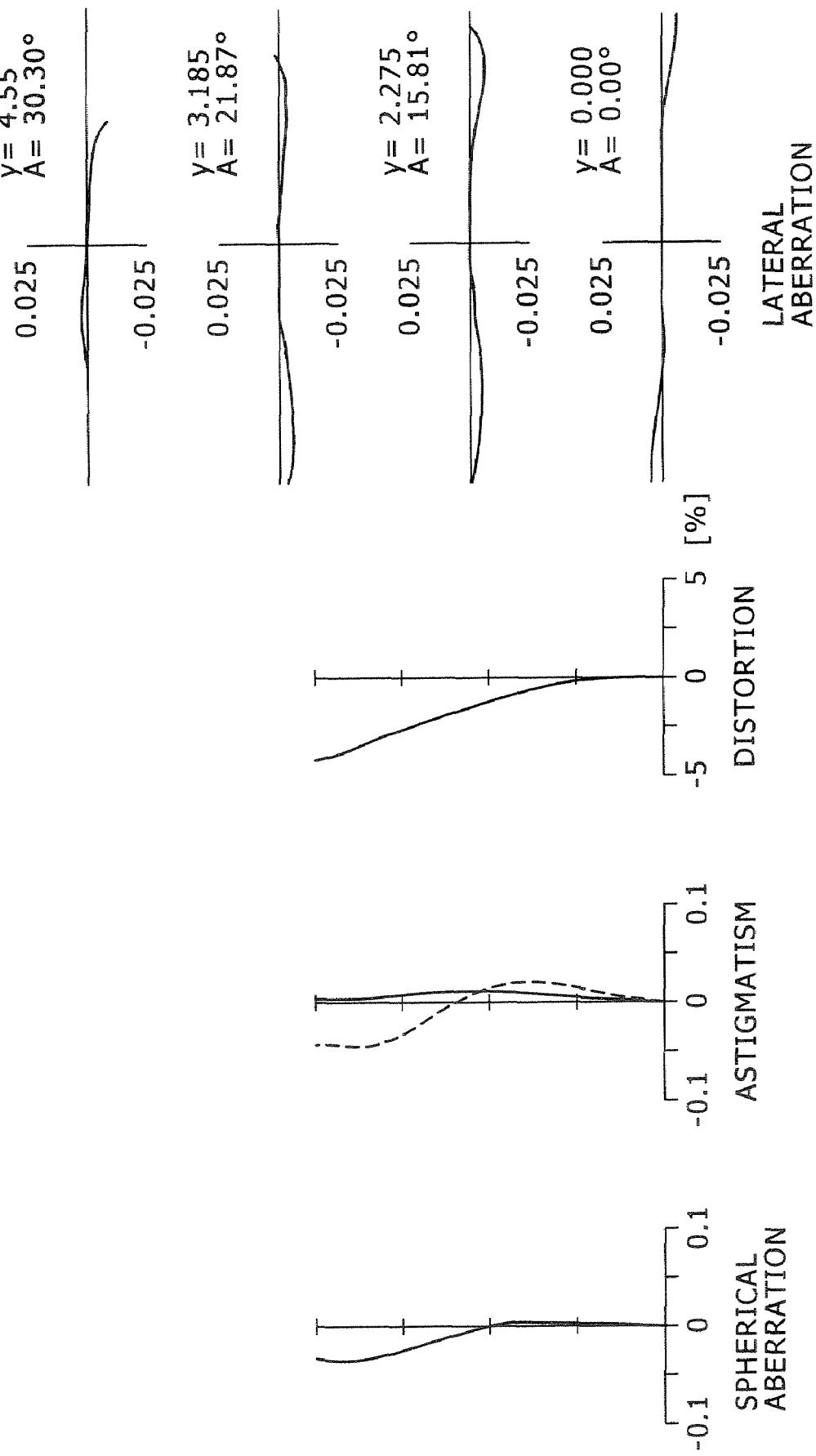
FIG. 3 shows various aberration diagrams of a numerical value example 1 in which concrete numerical values are applied to the first embodiment together with FIGS. 4-6, and the present diagram shows spherical aberration, astigmatism, distortion and lateral aberration in a wide angle end.
Figure 4:
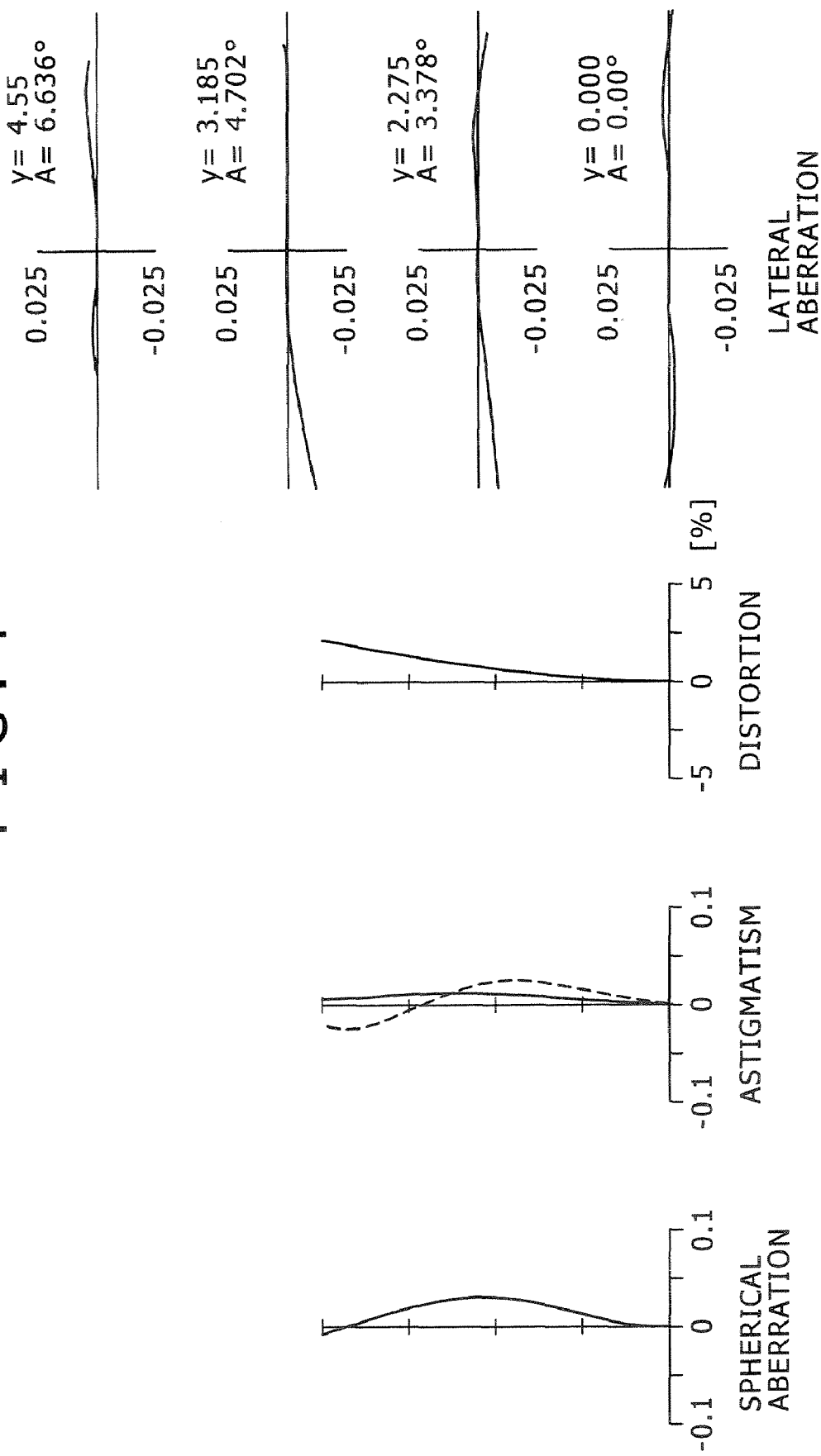
FIG. 4 shows spherical aberration, astigmatism, distortion and lateral aberration in a telephoto end.

FIGS. 3 and 4 severally show various aberration diagrams of the numerical value example 1 in the state of infinity focusing. FIG. 3 shows the various aberration diagrams at the wide angle end (f=8.143), and FIG. 4 shows the various aberration diagrams at the telephoto end (f=38.317).

In each aberration diagram in FIGS. 3 and 4, a solid line in the spherical aberration diagram expresses a spherical aberration, a solid line in the astigmatism diagram expresses a sagittal image plane, and a broken line in the astigmatism diagram expresses a meridional image plane. In each of the lateral aberration diagrams, A indicates a half-angle of view, and y indicates an image height.

Figure 5:
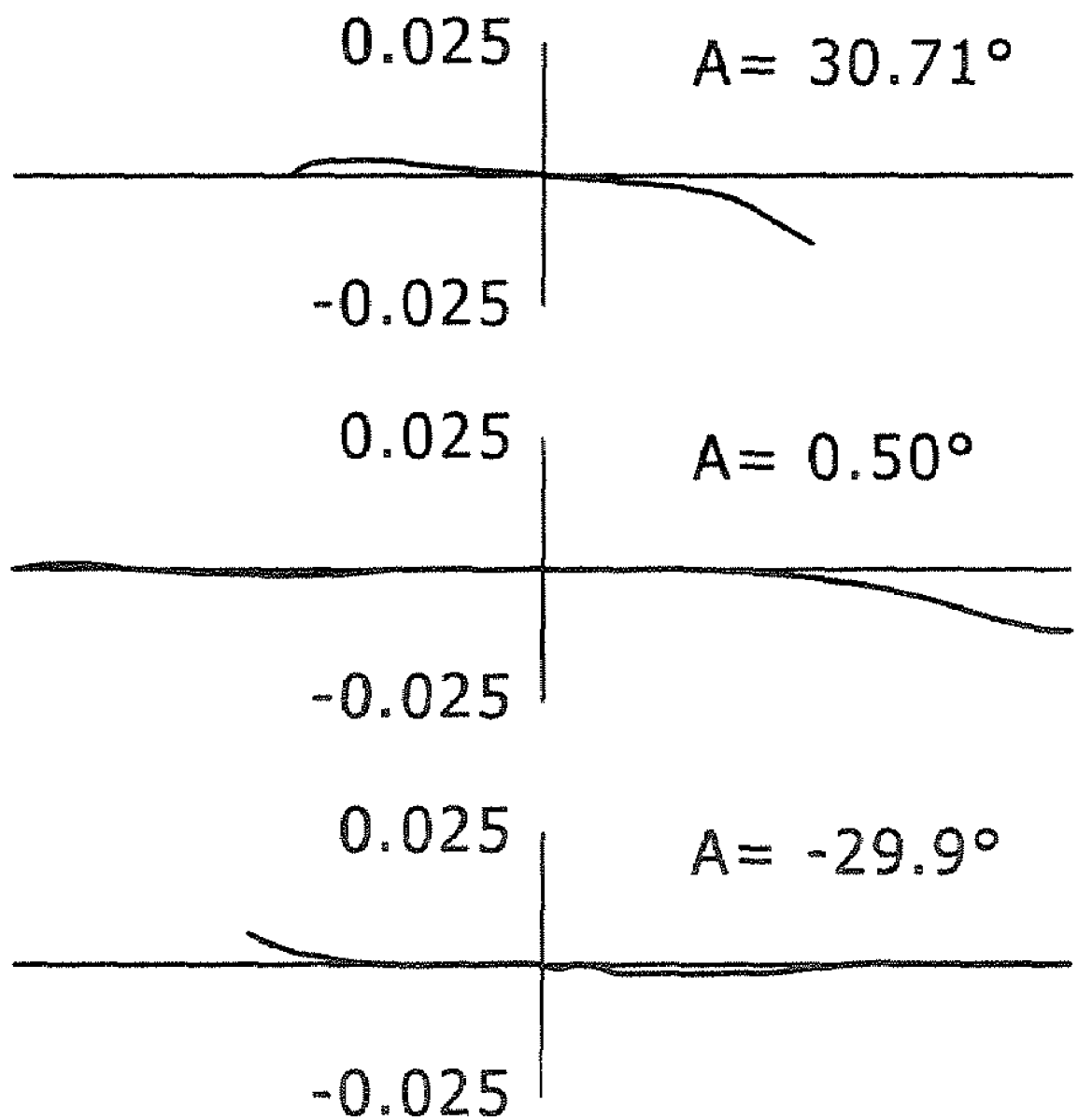
FIG. 5 shows lateral aberration in a state in which image movement equivalent to 0.5 degrees in the wide angle end has been corrected.
Figure 6:
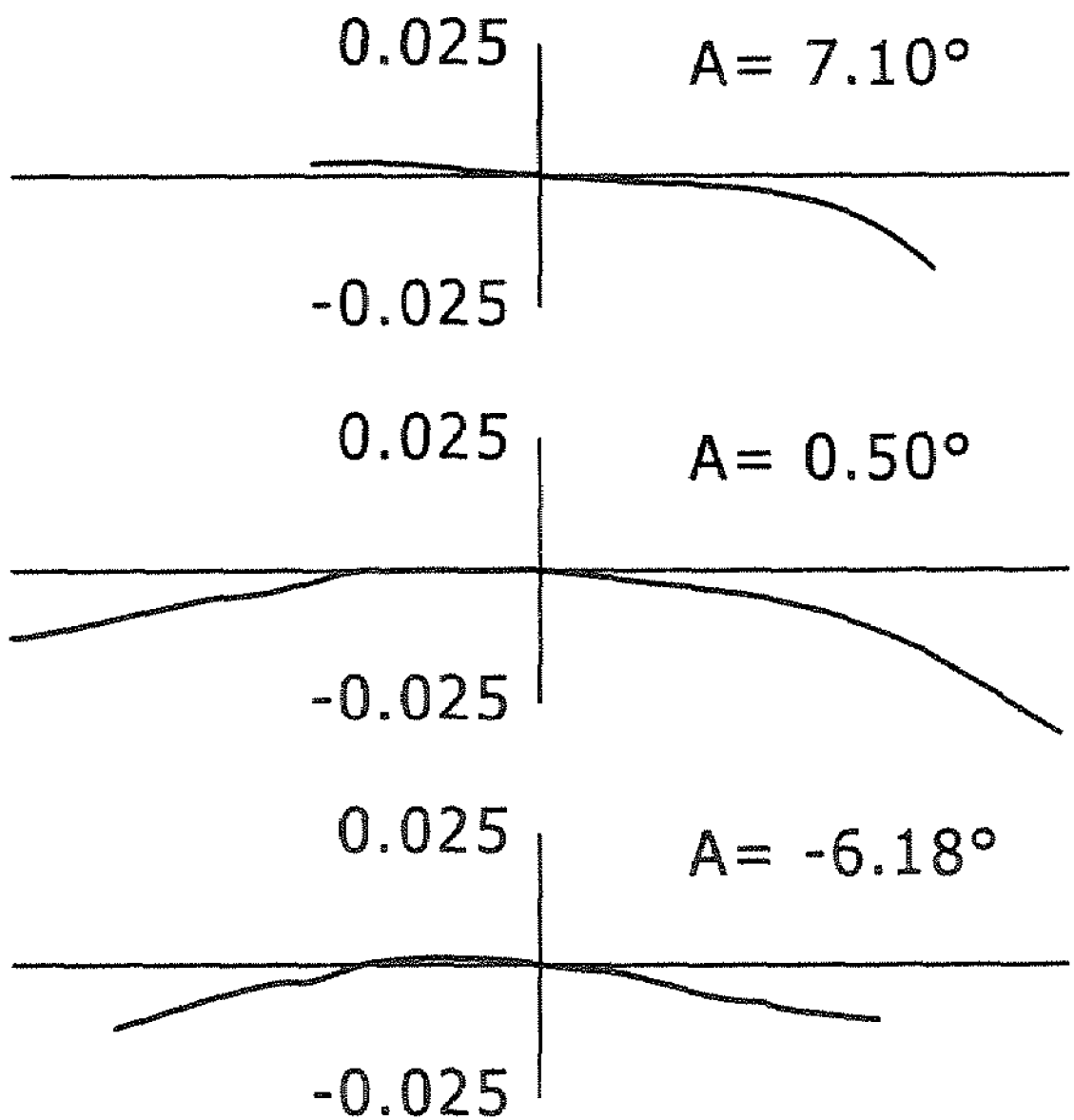
FIG. 6 shows lateral aberration in a state in which image movement equivalent to 0.5 degrees in the telephoto end has been corrected.

FIGS. 5 and 6 severally shows lateral aberration diagrams when a plane glass 3 is inclined by an amount necessary for correcting the image movement of 0.5 degrees in the infinity focusing in the numerical value example 1. FIG. 5 shows the lateral aberration diagrams in the wide angle end (f=8.143), and FIG. 6 shows the lateral aberration diagrams in the telephoto end (f=38.317).

It is clear from each aberration diagram that in the numerical value example 1 various aberrations are well corrected, and that the numerical value example 1 has an excellent image formation performance.

Figure 7:
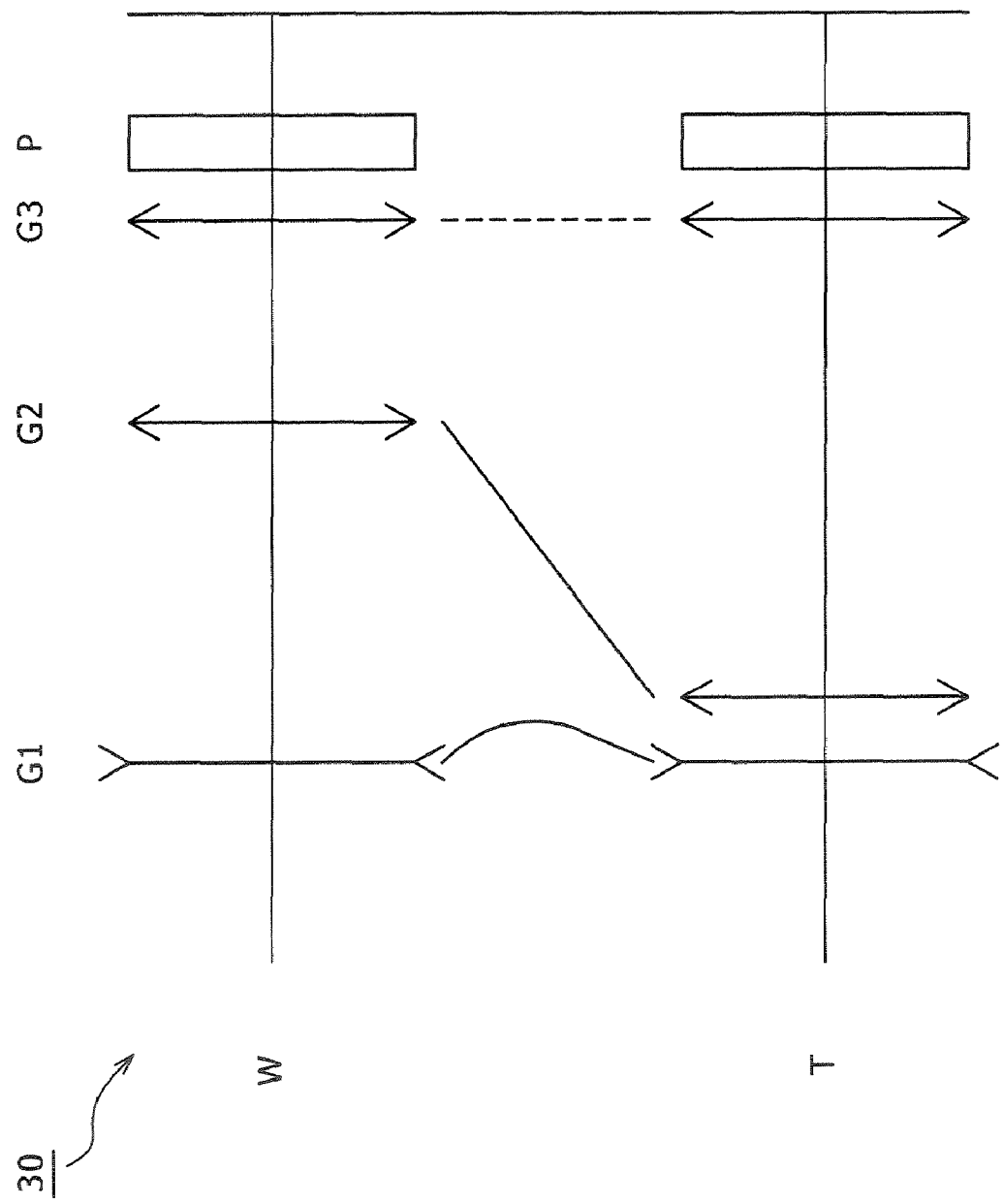
FIG. 7 is a diagram showing a refractive power arrangement of a zoom lens according to a second embodiment, and the capability of movement and a locus of the movement of each lens group at the time of magnification change.

FIG. 7 shows a refractive power arrangement of a zoom lens 30 according to a second embodiment. Three lens groups of a first lens group G1 having negative refractive power, a second lens group G2 having positive refractive power and a third lens group G3 having positive refractive power, and a prism P are arranged in order from an object side. When magnification is changed from a wide angle end to a telephoto end, the first lens group G1 moves to the object side after having moved to an image side once and the second lens group G2 moves to the object side so that the air space between the first lens group G1 and the second lens group G2 decreases and the air space between the second lens group G2 and the third lens group G3 increases. At this time, the third lens group G3 and the prism P are fixed in the optical axis direction, and the third lens group G3 moves to the object side at the time of a short distance focusing.

Figure 8:
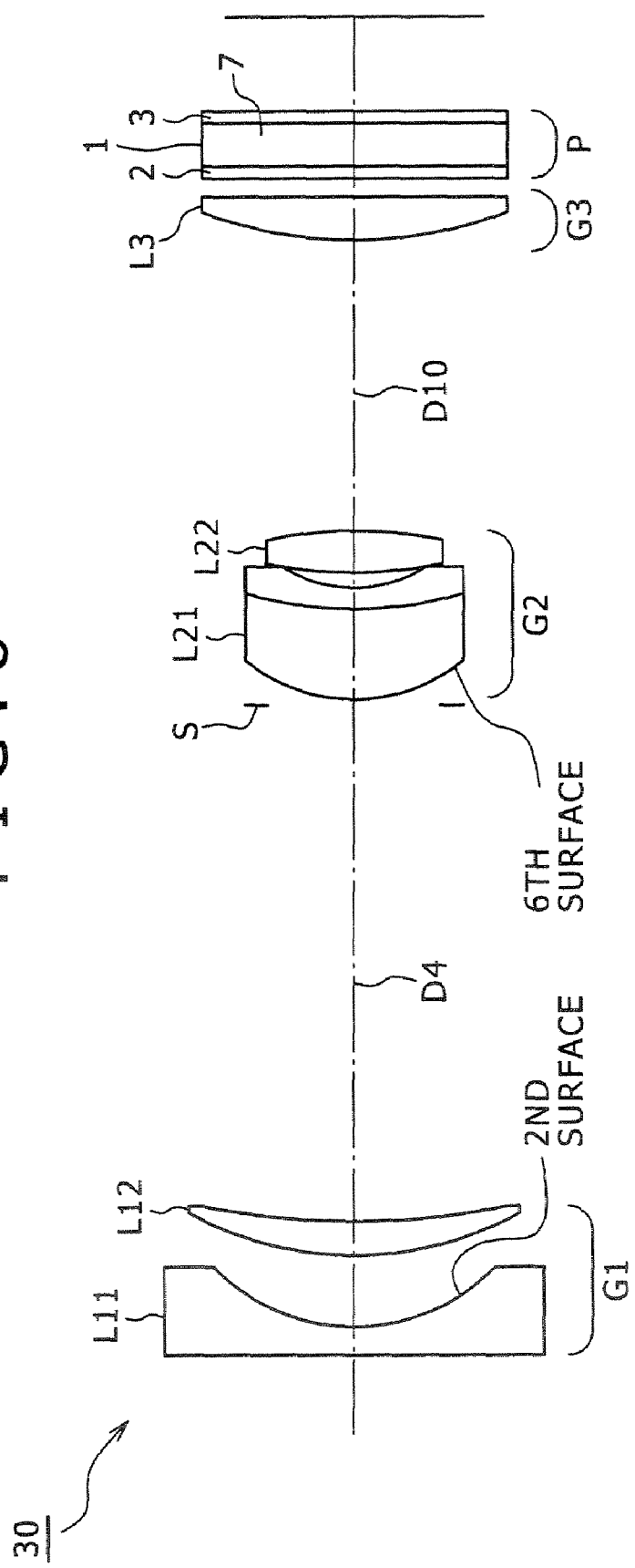
FIG. 8 is a view showing the lens configuration of the zoom lens according to the second embodiment.

FIG. 8 is a view showing the lens configuration of the zoom lens 30 according to the second embodiment, and each lens group is configured as follows.

The first lens group G1 includes a negative lens L11 having a convex surface facing the object side and being shaped in the meniscus form, and a positive lens L12 having a convex surface facing the object side and being shaped in the meniscus form. The second lens group G2 includes a cemented lens L21 of a positive lens having a convex surface facing the object side and being formed in the meniscus form and a negative lens having a concave surface facing the image side and being formed in the meniscus form; and a positive lens L22 formed in a biconvex form, both the lenses L21 and L22 arranged in order from the object side. The third lens group G3 includes a positive lens L3 having a convex surface facing the object side and being formed in the meniscus form. The prism P is designated by numeral 1 and has a structure shown in FIGS. 19 and 20.

In addition, an aperture diaphragm S is disposed at a position near to the object side of the second lens group G2, and moves together with the second lens group G2 when changing the magnification.

Table 6 shows the values of the specifications of the numerical value example 2 in which concrete numerical values are applied to the second embodiment.

TABLE 6

| | f<br>F NO<br>2 ω | | 8.03~26.48<br>2.88~5.72<br>61.26~19.49° | |
|---|---|---|---|---|
| SURFACE NUMBER | RADIUS OF CURVATURE | SURFACE INTERVAL | REFRACTION INDEX | ABBE NUMBER |
| 1: | 192.3597 | 1.000 | 1.79668 | 45.4 |
| 2: | 6.6890 | 2.874 | | |
| 3: | 13.3351 | 1.394 | 1.84666 | 23.8 |
| 4: | 35.9996 | (D4) | | |
| 5: | 0.0000 | 0.100 | | (APERTURE DIAPHRAGM) |
| 6: | 6.4472 | 3.434 | 1.80610 | 40.7 |
| 7: | 13.6986 | 0.800 | 1.92286 | 20.9 |
| 8: | 5.6517 | 0.604 | | |
| 9: | 16.0772 | 1.558 | 1.65160 | 58.4 |
| 10: | −20.7709 | (D10) | | |
| 11: | 16.6457 | 1.704 | 1.49700 | 81.6 |
| 12: | 666.6667 | 0.700 | | |
| 13: | 0.0000 | 0.500 | 1.51680 | 64.2 |
| 14: | 0.0000 | 1.500 | 1.51341 | 61.2 |
| 15: | 0.0000 | 0.500 | 1.51680 | 64.2 |
| 16: | 0.0000 | (Bf) | | |

A $2^{nd}$ surface and a $6^{th}$ surface are formed as aspherical surfaces. Then, the $4^{th}$, the $6^{th}$, the $8^{th}$ and the $10^{th}$ aspherical surface coefficients A, B, C and D of these surfaces in the numerical value example 2 are shown in Table 7 together with the conical constants κ.

TABLE 7

| 2ND SURFACE | κ = −1.867517<br>D = +0.000000E−00 | A = +0.443526E−03 | B = −0.213251E−05 | C = −0.000000E−00 |
|---|---|---|---|---|
| 6TH SURFACE | κ = −0.682338<br>D = +0.239730E−08 | A = +0.130127E−03 | B = +0.385416E−05 | C = −0.653694E−07 |

When the lens position arrangement changes from the wide angle end to the telephoto end, a surface interval D4 between the first lens group G1 and the aperture diaphragm S, and a surface interval D10 between the second lens group G2 and the third lens group G3 change. Accordingly, each of the surface intervals mentioned above and back-foci BF in the wide angle end sate (f=8.034) and the telephoto end (f=26.480) in the numerical value example 2 are shown in Table 8.

TABLE 8

(VARIABLE INTERVAL TABLE)

| f | 8.034 | 26.480 |
|---|---|---|
| D4 | 19.712 | 2.532 |
| D10 | 10.954 | 33.084 |
| Bf | 3.506 | 3.506 |

Figure 9:
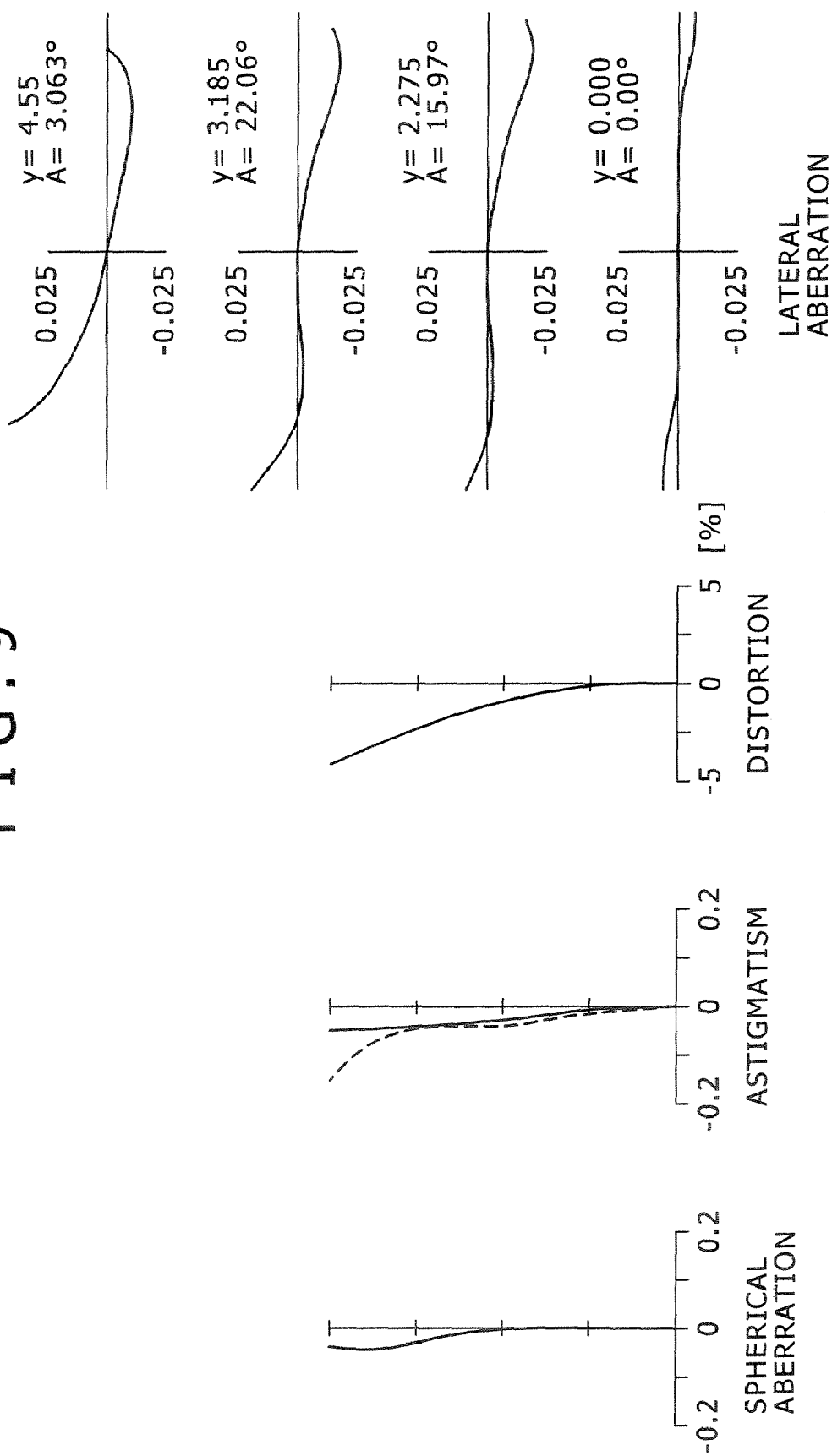
FIG. 9 shows various aberration diagrams of a numerical value example 2 in which concrete numerical values are applied to the second embodiment together with FIGS. 10-12, and the present diagram shows spherical aberration, astigmatism, distortion and lateral aberration in a wide angle end.

In the following, the inclination angles of the incident plane and the exit plane of the prism necessary to correct the image movement of 0.5 degrees in the numerical value example 2 in each of the wide angle end (f=8.034) and the telephoto end (f=26.480) are shown in FIG. 9.

TABLE 9

| f | 8.034 | 26.480 |
|---|---|---|
| INCIDENT PLANE | 0.652 DEGREES | 3.060 DEGREES |
| EXIT PLANE | 2.22 DEGREES | 7.24 DEGREES |

Corresponding values of φb, Ymax and each of the conditional expressions (3)-(5) in the numerical value example 2 are shown in Table 10.

TABLE 10

| φb = 0.063 |
| Ymax = 4.55 |
| (1) φb/φ = 0.509 |
| (2) Bf · FN0/Ymax = 4.408 |
| (3) Ds/TL = 0.509 |

Figure 10:
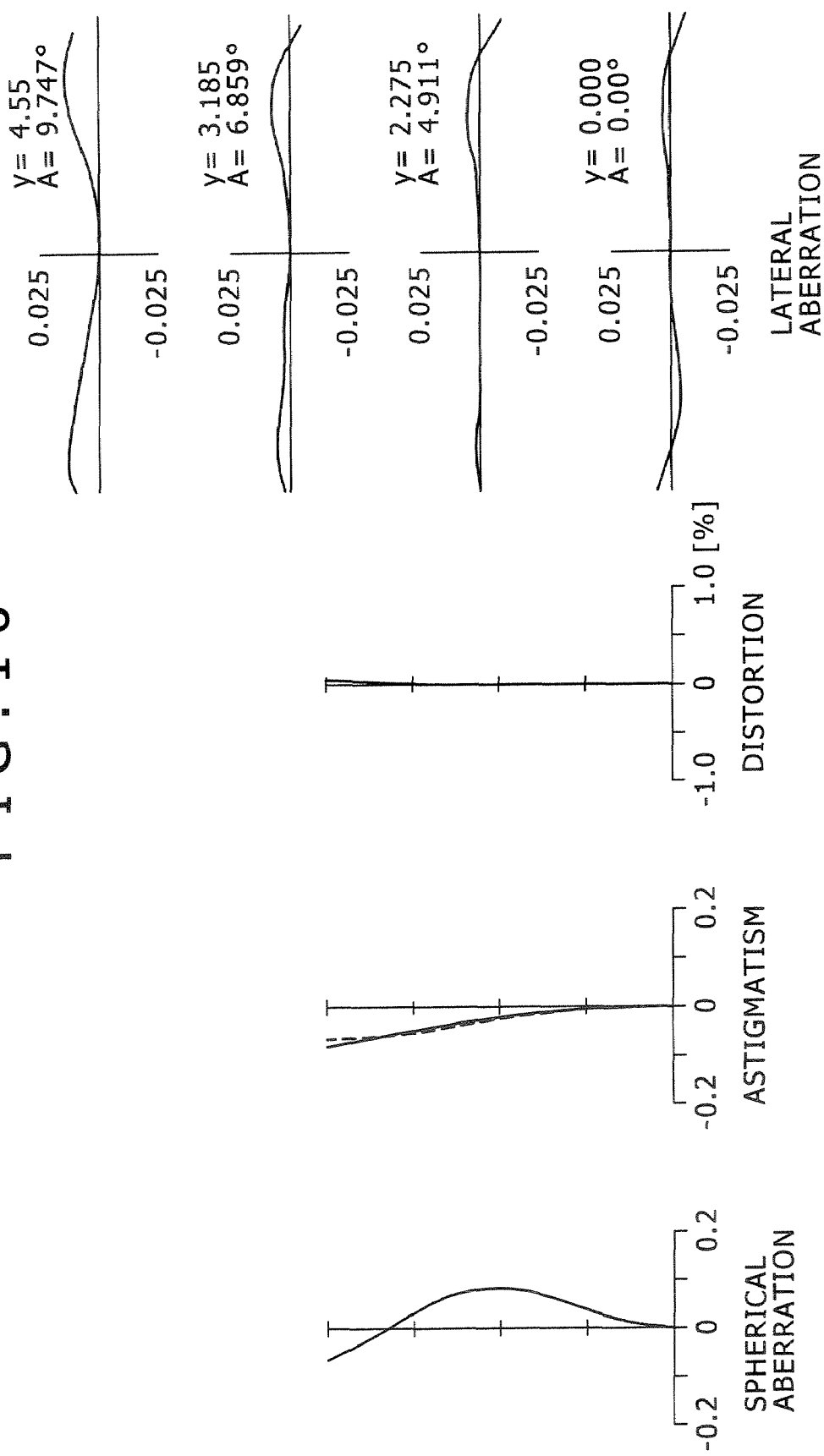
FIG. 10 shows spherical aberration, astigmatism, distortion and lateral aberration in a telephoto end.

FIGS. 9 and 10 severally show various aberration diagrams of the numerical value example 2 in the state of infinity focusing. FIG. 9 shows the various aberration diagrams at the wide angle end (f=8.034), and FIG. 10 shows the various aberration diagrams at the telephoto end (f=26.480).

In each aberration diagram in FIGS. 9 and 10, a solid line in the spherical aberration diagram expresses a spherical aberration, a solid line in the astigmatism diagram expresses a sagittal image plane, and a broken line in the astigmatism diagram expresses a meridional image plane. In each of the lateral aberration diagrams, A indicates a half-angle of view, and y indicates an image height.

Figure 11:
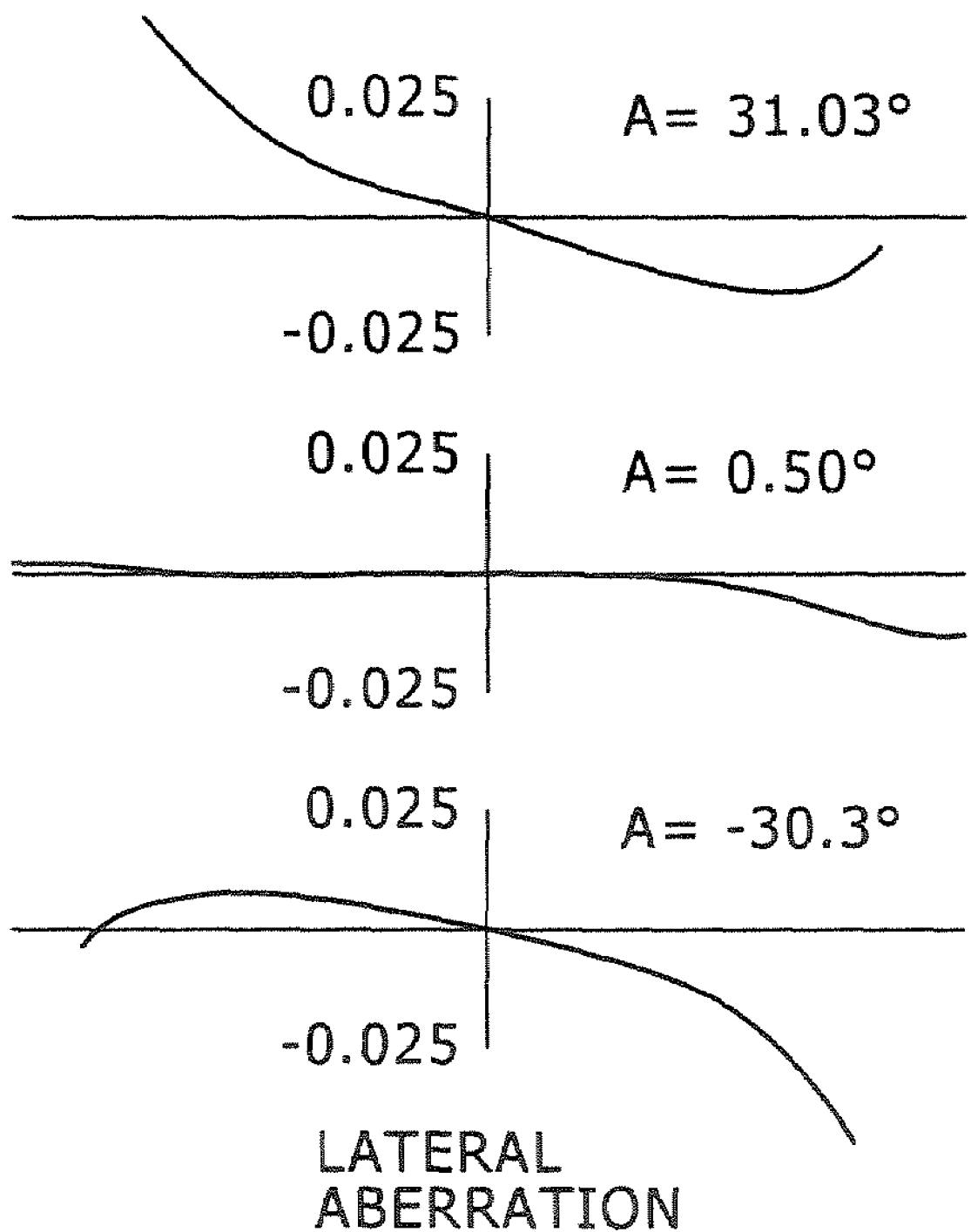
FIG. 11 shows lateral aberration in a state in which image movement equivalent to 0.5 degrees in the wide angle end has been corrected.
Figure 12:
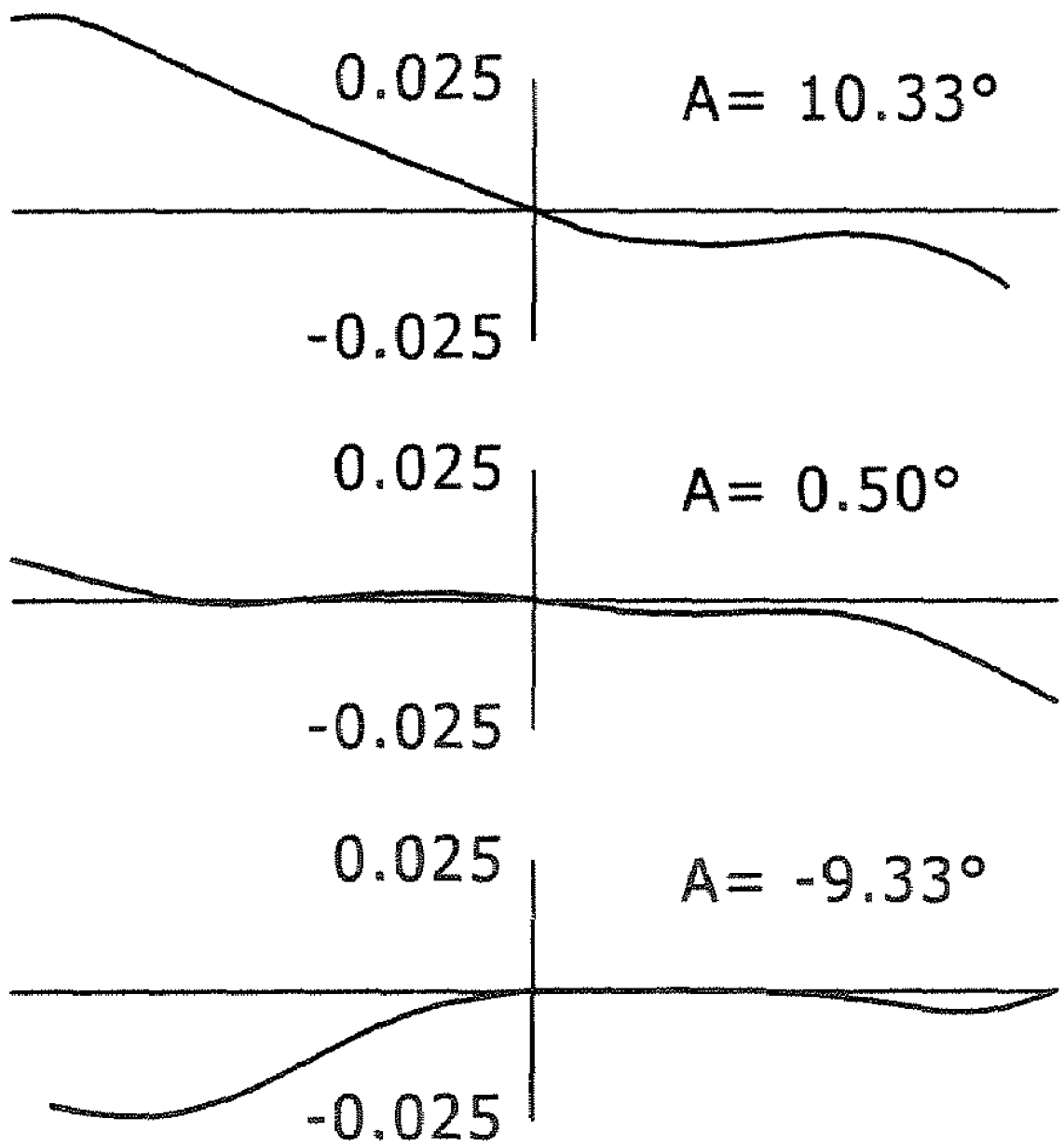
FIG. 12 shows lateral aberration in a state in which image movement equivalent to 0.5 degrees in the telephoto end has been corrected.

FIGS. 11 and 12 severally shows lateral aberration diagrams when a plane glass 3 is inclined by an amount necessary for correcting the image movement of 0.5 degrees in the infinity focusing in the numerical value example 2. FIG. 11 shows the lateral aberration diagrams in the wide angle end (f=8.034), and FIG. 12 shows the lateral aberration diagrams in the telephoto end (f=26.480).

It is clear from each aberration diagram that in the numerical value example 2 various aberrations are well corrected, and that the numerical value example 2 has an excellent image formation performance.

Figure 13:
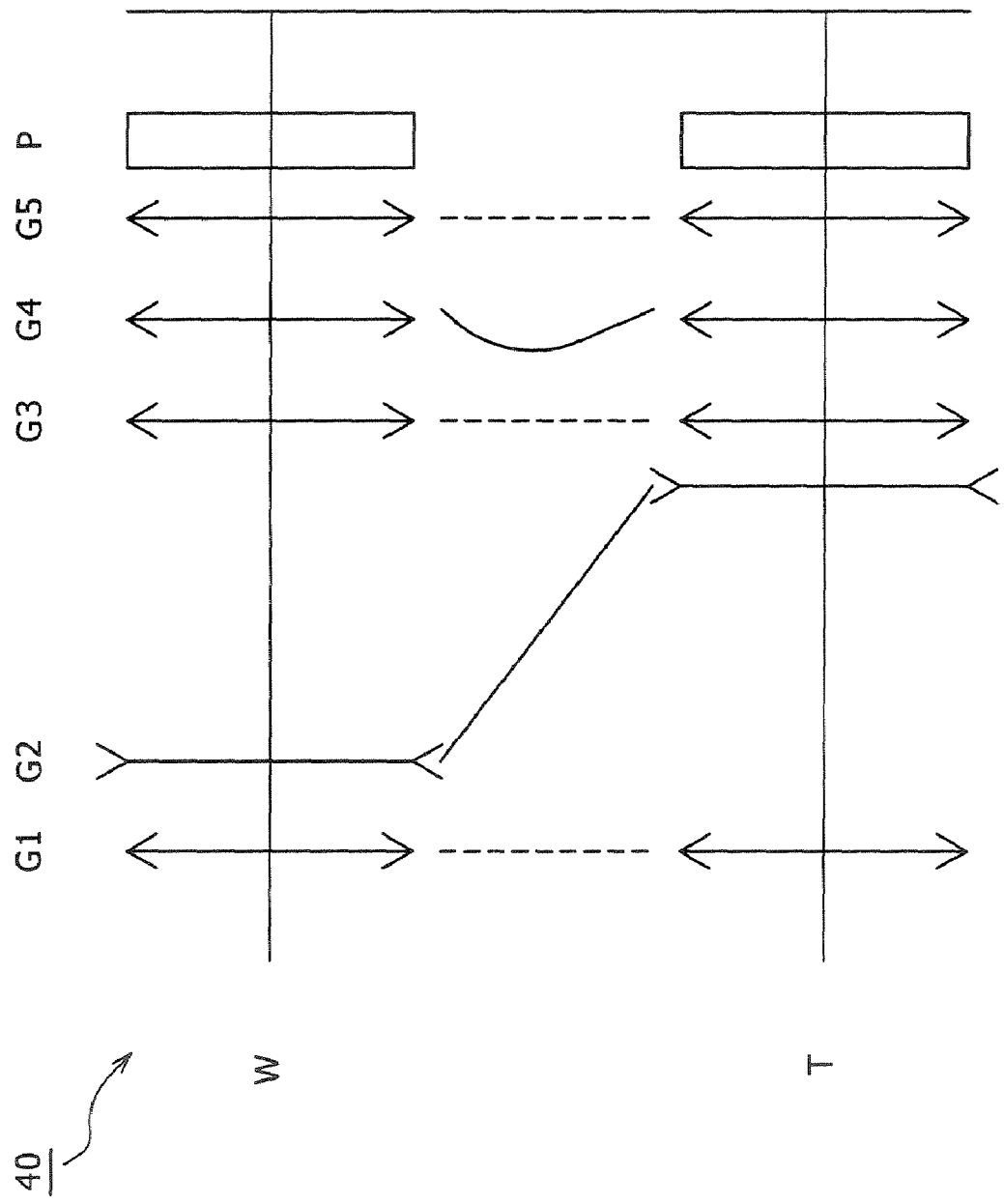
FIG. 13 is a diagram showing a refractive power arrangement of a zoom lens according to a third embodiment, and the capability of movement and a locus of the movement of each lens group at the time of magnification change.

FIG. 13 shows a refractive power arrangement of a zoom lens 40 according to a third embodiment. A first lens group G1 having positive refractive power, a second lens group G2 having negative refractive power, a third lens group G3 having positive refractive power, a fourth lens group G4 having positive refractive power, a fifth lens group G5 having positive refractive power and a prism P are arranged in order from an object side. When the magnification is changed from a wide angle end to a telephoto end, the second lens group G2 moves to an image side so that the air space between the first lens group G1 and the second lens group G2 increases and the air space between the second lens group G2 and the third lens group G3 decreases. At this time, the first lens group G1, the third lens group G3, the fifth lens group G5 and the prism P are fixed, and the fourth lens group G4 moves in order to correct a change of an image plane position accompanying the movement of the second lens group G2. The fourth lens group G4 moves to the object side at the time of a short distance focusing.

Figure 14:
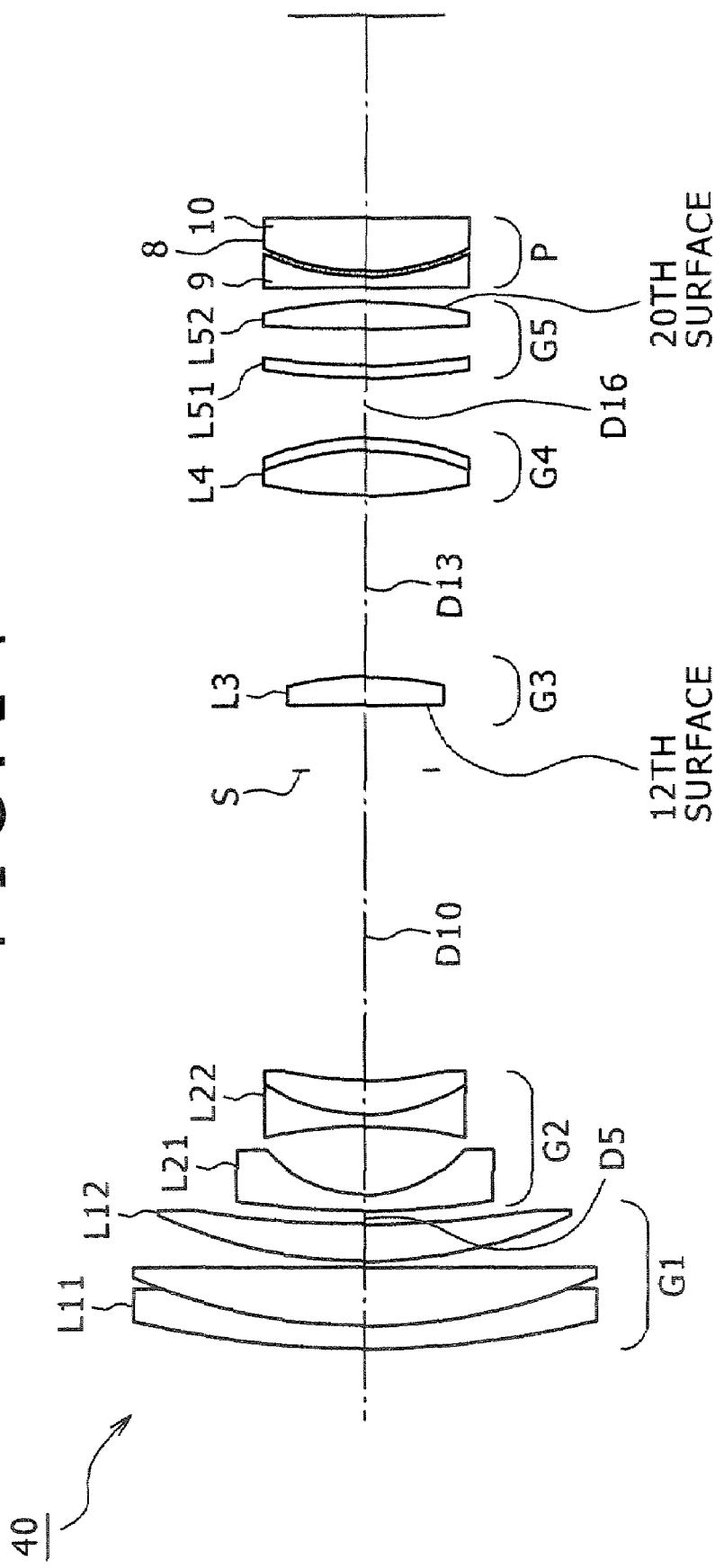
FIG. 14 is a view showing the lens configuration of the zoom lens according to the third embodiment.

FIG. 14 is a view showing the lens configuration of the zoom lens 40 according to the third embodiment, and each lens group is configured as follows.

The first lens group G1 includes cemented lens L11 of a negative lens having a convex surface facing the object side and being shaped in the meniscus form, and a positive lens having a convex surface facing the object side; and a positive lens L12 having a convex surface facing the object side. The second lens group G2 includes a negative lens L21 having a concave surface facing the image side and being formed in the meniscus form, and a cemented lens L22 of a negative lens formed in a biconcave form and a positive lens having a convex surface facing the object side and being formed in the meniscus form. The third lens group G3 includes a positive lens L3 formed in a biconvex form. The fourth lens group G4 includes a cemented positive lens L4 of a positive lens formed in a biconvex form and a negative lens having a concave surface facing the object side and being formed in the meniscus form. The fifth lens group G5 includes a negative lens L51 having a concave surface facing the image side and being formed in the meniscus form, and a biconvex lens L51. The prism P is designated by numeral 8 and has a structure shown in FIGS. 21 and 22.

In addition, an aperture diaphragm S is disposed at a position near to the object side of the third lens group G3, and is fixed when changing the magnification.

Table 11 shows the values of the specifications of the numerical value example 3 in which concrete numerical values are applied to the third embodiment.

TABLE 11

| | f<br>F N0<br>2 ω | | 8.14~38.32<br>2.88~3.24<br>60.60~13.27° | |
|---|---|---|---|---|
| SURFACE NUMBER | RADIUS OF CURVATURE | SURFACE INTERVAL | REFRACTION INDEX | ABBE NUMBER |
| 1: | 58.0469 | 1.200 | 1.92286 | 20.9 |
| 2: | 31.8566 | 3.472 | 1.77250 | 49.6 |
| 3: | 385.6446 | 0.200 | | |
| 4: | 26.5423 | 2.557 | 1.69680 | 55.3 |
| 5: | 72.1279 | (D5) | | |
| 6: | 72.1279 | 0.600 | 1.88300 | 40.8 |
| 7: | 7.7200 | 4.387 | | |
| 8: | −31.7152 | 0.500 | 1.49700 | 81.6 |
| 9: | 9.1943 | 2.299 | 1.90366 | 31.1 |
| 10: | 30.4291 | (D10) | | |
| 11: | 0.0000 | 4.000 | | (APERTURE DIAPHRAGM) |
| 12: | 85.6791 | 1.335 | 1.76802 | 49.3 |

TABLE 11-continued

| 13: | −43.0892 | (D13) | | |
|---|---|---|---|---|
| 14: | 33.2563 | 2.706 | 1.49700 | 81.6 |
| 15: | −14.3230 | 0.500 | 1.94595 | 18.0 |
| 16: | −19.0368 | (D16) | | |
| 17: | 36.0011 | 0.500 | 1.94595 | 18.0 |
| 18: | 25.0000 | 2.546 | | |
| 19: | 100.0000 | 1.249 | 1.62041 | 60.3 |
| 20: | −30.7532 | 1.000 | | |
| 21: | 0.0000 | 0.800 | 1.51680 | 64.2 |
| 22: | 15.0000 | 0.200 | 1.51341 | 61.2 |
| 23: | 15.0000 | 3.000 | 1.51680 | 64.2 |
| 24: | 0.0000 | (Bf) | | |

A $12^{th}$ surface and a $20^{th}$ surface are formed as aspherical surfaces. Then, the $4^{th}$, the $6^{th}$, the $8^{th}$ and the $10^{th}$ aspherical surface coefficients A, B, C and D of these surfaces in the numerical value example 3 are shown in Table 12 together with the conical constants κ.

TABLE 12

| 12TH SURFACE | κ = −2.195038<br>D = +0.749312E−09 | A = −0.328381E−04 | B = +0.772945E−06 | C = −0.452069E−07 |
|---|---|---|---|---|
| 20TH SURFACE | κ = 0.000000<br>D = −0.418081E−09 | A = +0.512475E−04 | B = −0.870496E−06 | C = +0.335183E−07 |

When the lens position arrangement changes from the wide angle end to the telephoto end, a surface interval D5 between the first lens group G1 and the second lens group G2, a surface interval D10 between the second lens group G2 and the aperture diaphragm S, a surface interval D13 between the third lens group G3 and the fourth lens group G4, and a surface interval D16 between the fourth lens group G4 and the fifth lens group G5 change. Accordingly, each of the surface intervals mentioned above and back-foci BF in the wide angle end sate (f=8.143) and the telephoto end (f=38.317) in the numerical value example 3 are shown in Table 13.

TABLE 13

| (VARIABLE INTERVAL TABLE) | | |
|---|---|---|
| f | 8.143 | 38.317 |
| D5 | 0.900 | 17.980 |
| D10 | 18.881 | 1.801 |
| D13 | 11.469 | 6.016 |
| D16 | 3.865 | 9.288 |
| Bf | 12.132 | 12.132 |

The inclination angles of the incident plane and the exit plane of the prism necessary to correct the image movement of 0.5 degrees in the numerical value example 3 in each of the wide angle end (f=8.143) and a the telephoto end (f=38.317) are shown in the following FIG. 14.

TABLE 14

| f | 8.143 | 38.317 |
|---|---|---|
| INCIDENT PLANE | 0.652 DEGREES | 3.060 DEGREES |
| EXIT PLANE | 0.649 DEGREES | 3.060 DEGREES |

Corresponding values of φb, Ymax and each of the conditional expressions (3)-(5) in the numerical value example 3 is shown in Table 15.

TABLE 15

φb = 0.051
Ymax = 4.55
(1) φb/φ = 0.415
(2) Bf · FN0/Ymax = 8.639
(3) Ds/TL = 0.564

Figure 15:
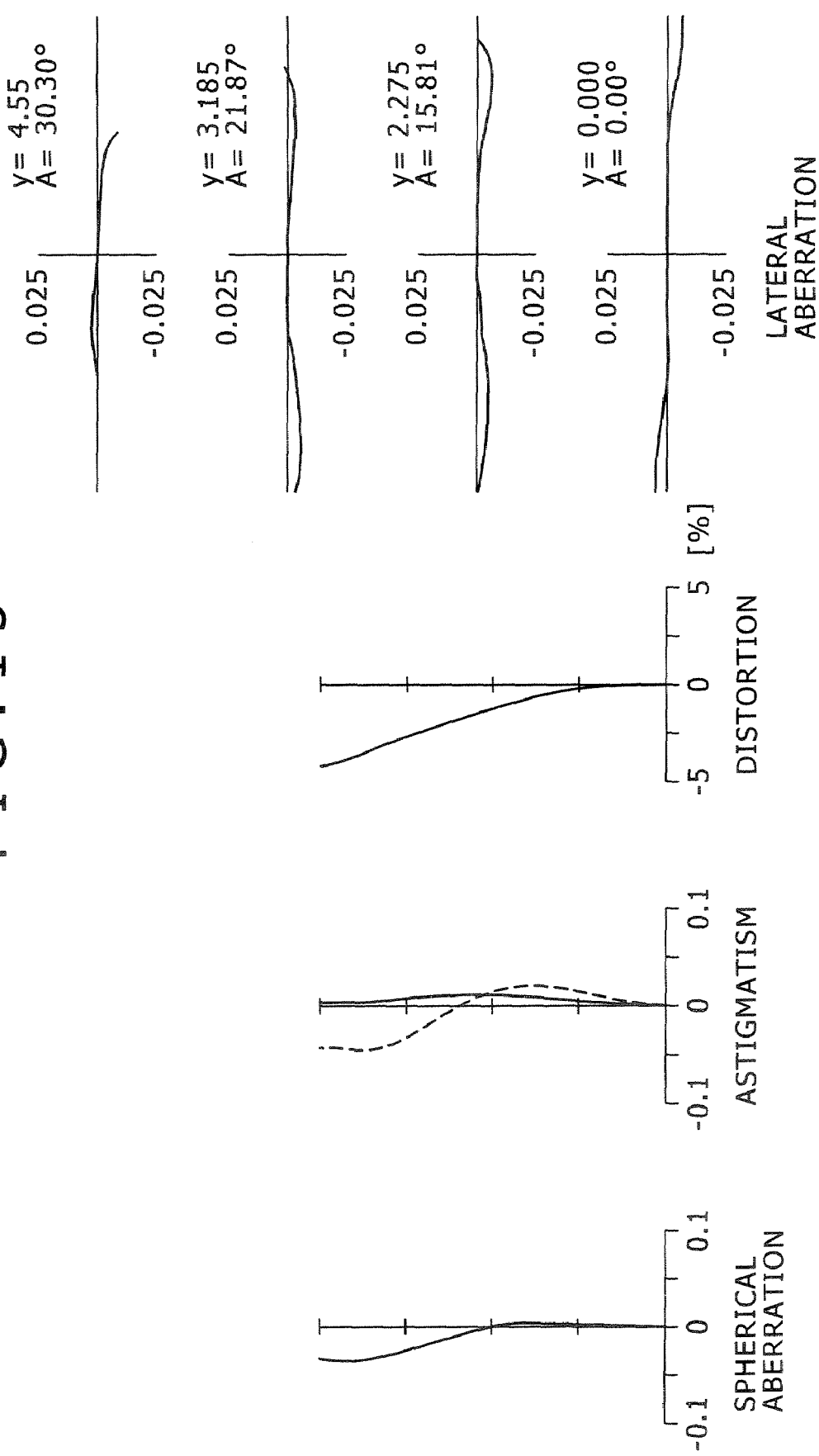
FIG. 15 shows various aberration diagrams of a numerical value example 3 in which concrete numerical values are applied to the third embodiment together with FIGS. 16-18, and the present diagram shows spherical aberration, astigmatism, distortion and lateral aberration in a wide angle end.
Figure 16:
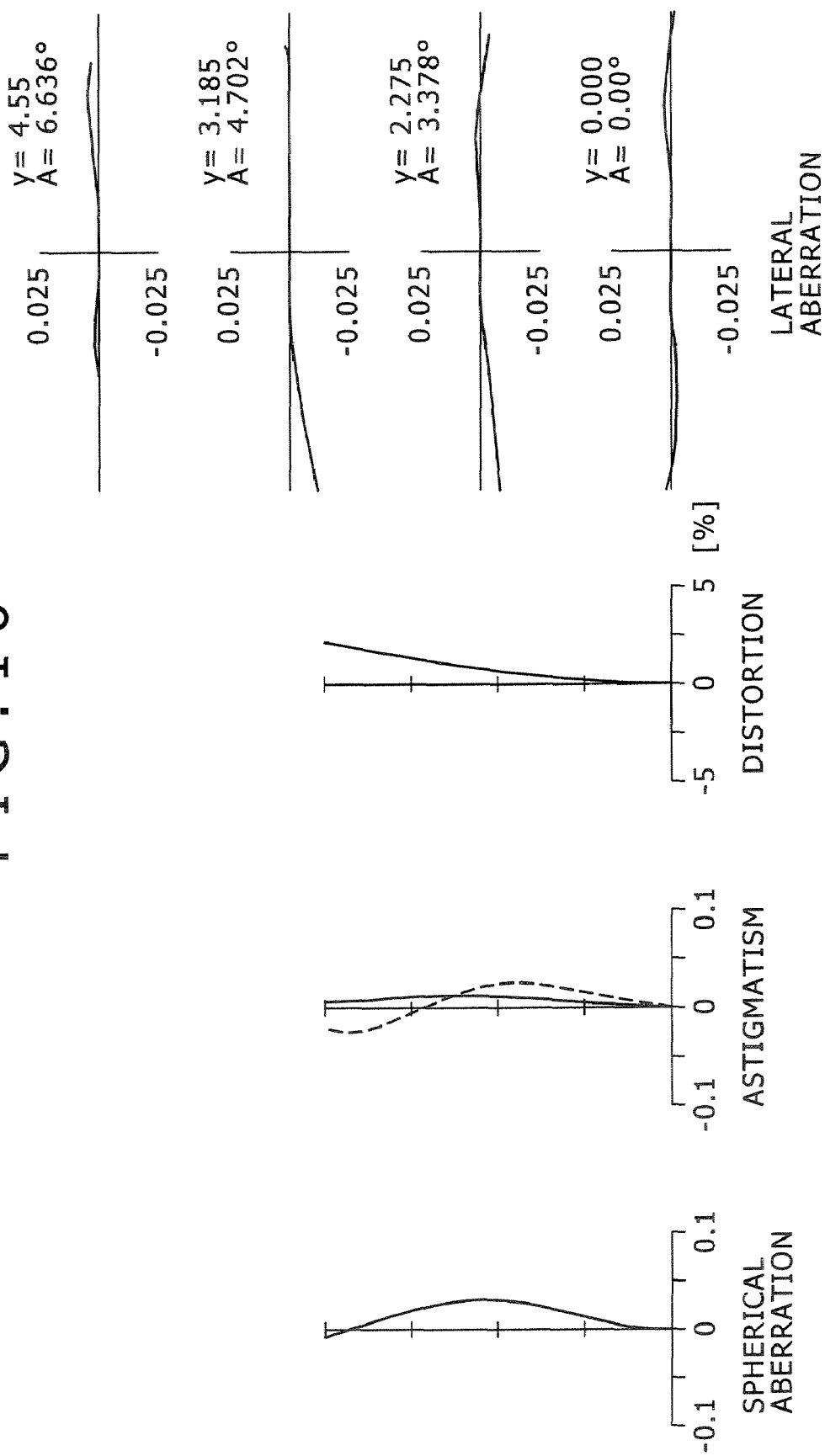
FIG. 16 shows spherical aberration, astigmatism, distortion and lateral aberration in a telephoto end.

FIGS. 15 and 16 severally show various aberration diagrams of the numerical value example 3 in the state of infinity focusing. FIG. 15 shows the various aberration diagrams at the wide angle end (f=8.143), and FIG. 16 shows the various aberration diagrams at the telephoto end (f=38.317).

In each aberration diagram in FIGS. 15 and 16, a solid line in the spherical aberration diagram expresses a spherical aberration, a solid line in the astigmatism diagram expresses a sagittal image plane, and a broken line in the astigmatism diagram expresses a meridional image plane. In each of the lateral aberration diagrams, A indicates a half-angle of view, and y indicates an image height.

Figure 17:
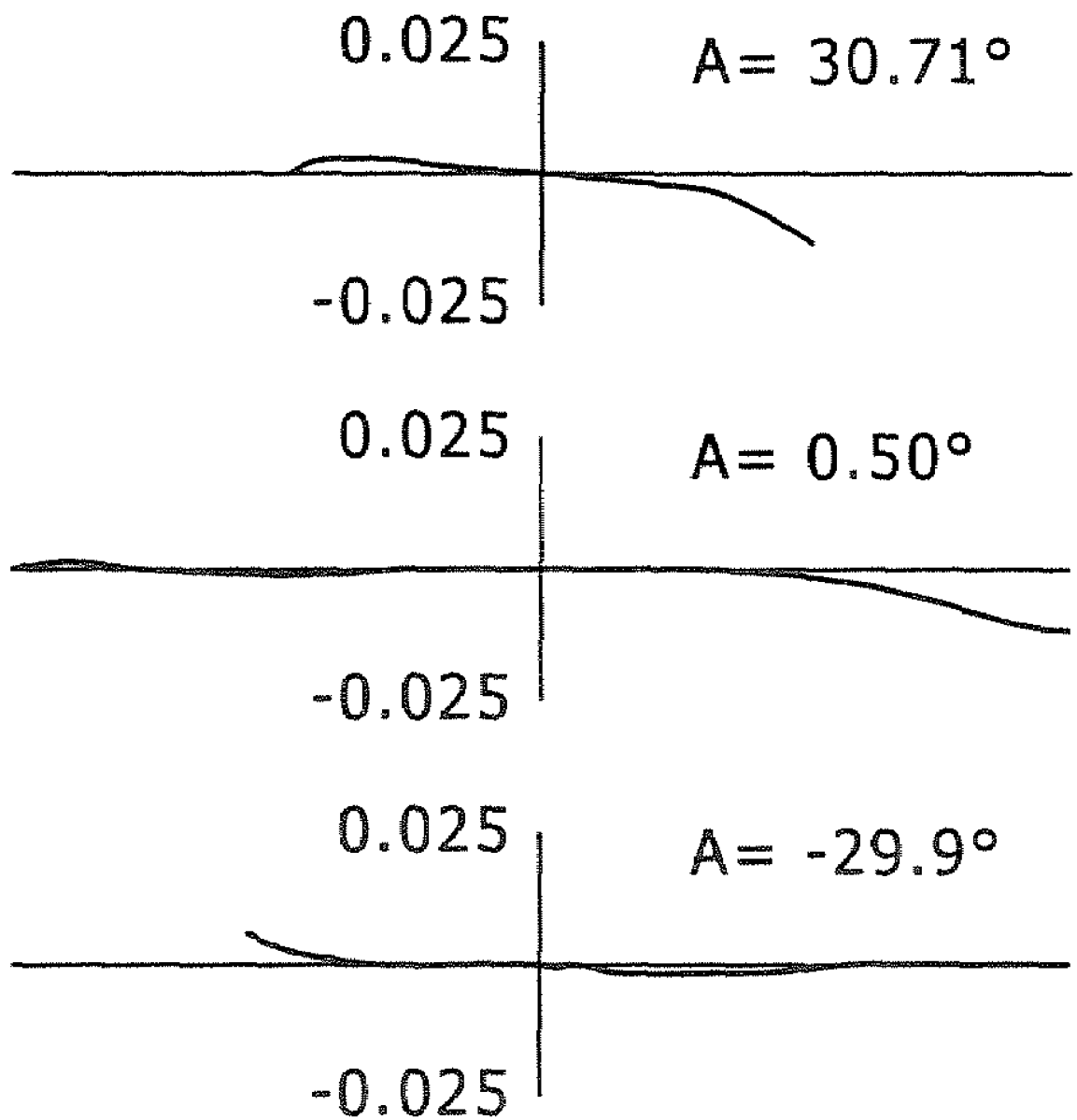
FIG. 17 shows lateral aberration in a state in which image movement equivalent to 0.5 degrees in the wide angle end has been corrected.
Figure 18:
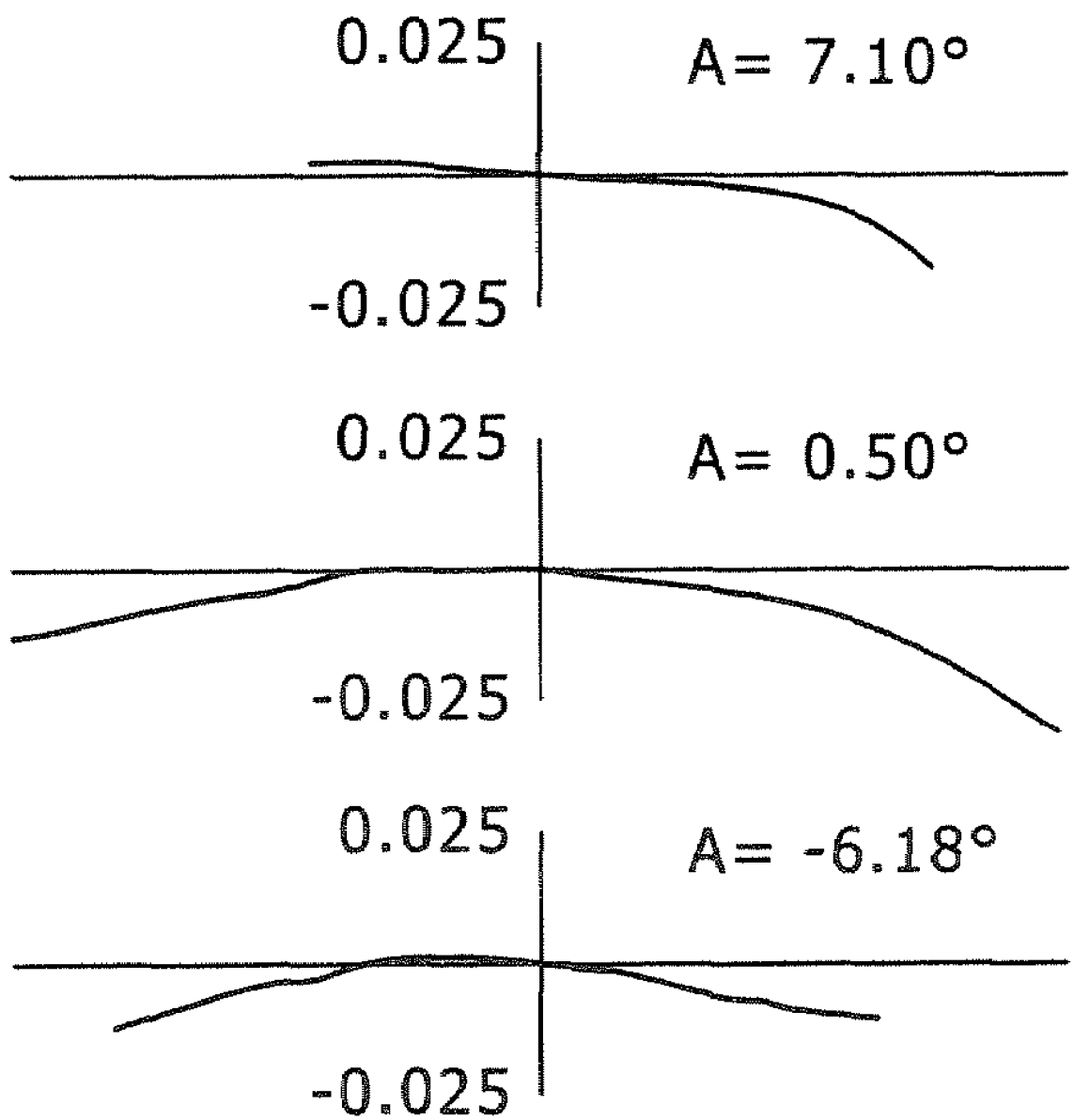
FIG. 18 shows lateral aberration in a state in which image movement equivalent to 0.5 degrees in the telephoto end has been corrected.

FIGS. 17 and 18 severally shows lateral aberration diagrams when the convex-plane lens 10 is inclined by 0.5 degrees in the infinity focusing in the numerical value example 3. FIG. 17 shows the lateral aberration diagrams in the wide angle end (f=8.143), and FIG. 18 shows the lateral aberration diagrams in the telephoto end (f=38.317).

It is clear from each aberration diagram that in the numerical value example 3 various aberrations are well corrected, and that the numerical value example 3 has an excellent image formation performance.

Figure 24:
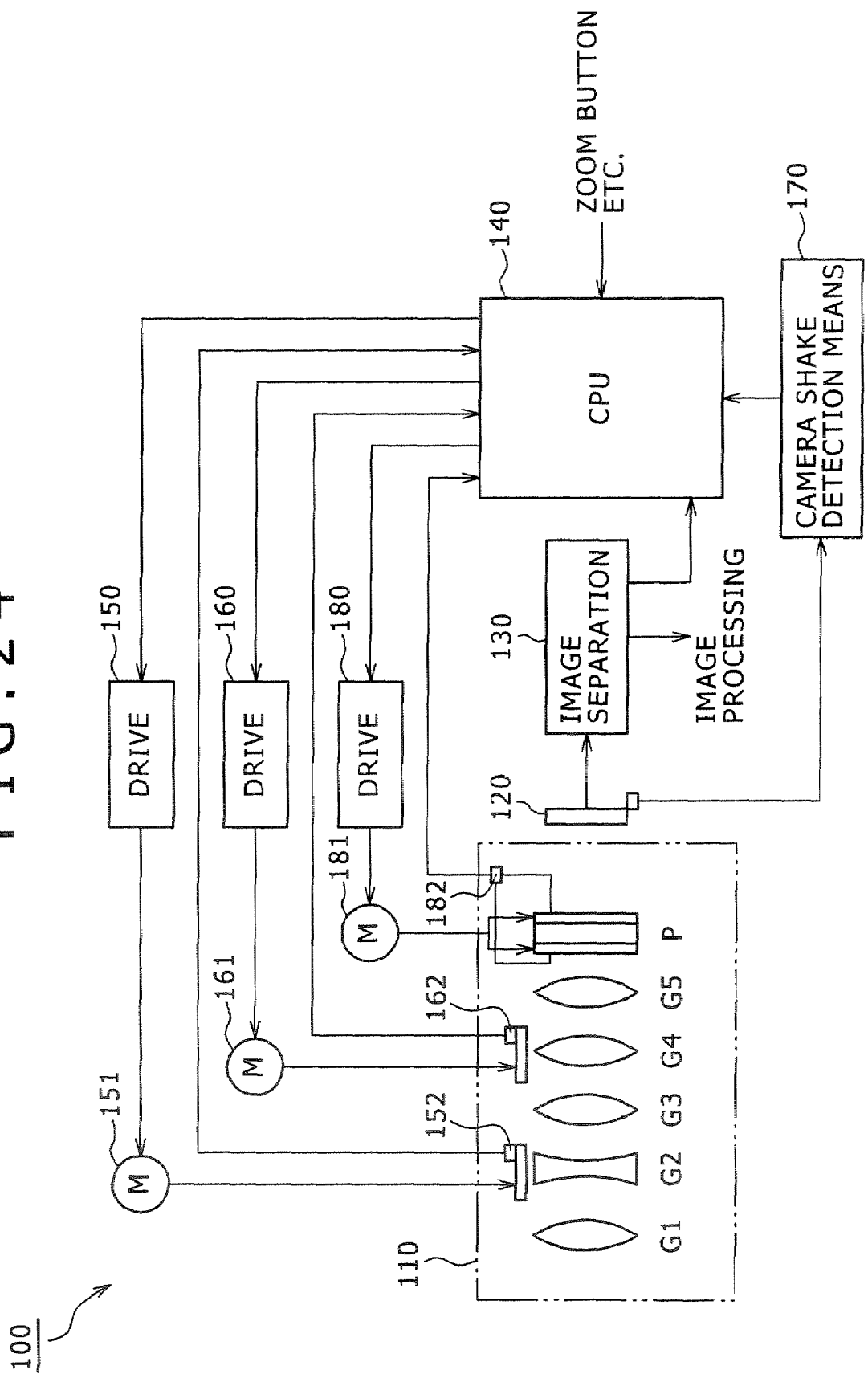
FIG. 24 is a block diagram showing an embodiment of an imaging apparatus.

FIG. 24 shows an embodiment of an application of an imaging apparatus of the present invention.

An imaging apparatus 100 is equipped with a zoom lens 110, and has an imaging device 120 which converts an optical image formed by the zoom lens 110 into an electric signal. In addition, as the imaging device 120, one using, for example, a photoelectric conversion device such as a charge coupled device (CCD), a complementary metal-oxide semiconductor (CMOS) or the like can be applied. The zoom lens according to the present invention can be applied to the zoom lens 110, and the lens groups of the zoom lens 20 shown in FIG. 2 according to the first embodiment are shown by being simplified to single lenses in FIG. 24. It is needless to say, that not only the zoom lens 20 according to the first embodiment but also the zoom lenses 30 and 40 according to the second and the third embodiments, respectively, and the zoom lenses according to the aspects of the present invention configured in forms other than those of the embodiments shown in the present specification can be used.

The electric signal formed by the imaging device 120 is separated by an image separation circuit 130. A signal for focus control is transmitted to a control circuit 140, and a signal for an image is transmitted to an image processing circuit. The signal transmitted to the image processing circuit is processed into a form suitable for the post-processing, and is supplied to various pieces of processing such as a display by a display apparatus, recording to a recording medium, transfer by communication means and the like.

An operation signal from the outside, such as an operation of, for example, a zoom button, is input into the control circuit 140, and various pieces processing is performed according to the operation signal. For example, when a zooming instruction by the zoom button is input, drive units 151 and 161 are operated through driver circuits 150 and 160 in order to make the zoom lens 110 in a focus distance sate based on the instruction, and each of the lens groups G2 and G4 is moved to a predetermined position. The positional information of each of the lens groups G2 and G4 acquired by each of the sensors 152 and 162 respectively, is input into the control circuit 140, and is referred to when the instruction signal is output to the driver circuits 150 and 160. Moreover, the control circuit 140 checks the focus state based on the signal transmitted from the image separation circuit 130, and operates the derive unit 161 through the driver circuit 160 to perform the position control of the fourth lens group G4 in order to acquire the optimum focus state.

The imaging apparatus 100 is equipped with a camera shake correction function. For example, camera shake detection means 170 such as one composed of two angular velocity sensors to detect the angular velocities in two opposing directions independently detects a movement angle of the zoom lens 110 caused by a depression of the shutter release button, and the detected signal is output. Then, the detected signal from the camera shake detection means 170 is input into the control circuit 140, and an apex angle of the prism 1 necessary to compensate the movement of an image caused by the movement of the zoom lens 110 is calculated in the control circuit 140. A driver unit 181 is operated through a driver circuit 180 in order to incline the parallel flat plates 2 and/or 3 of the prism 1 to form the calculated apex angle mentioned above, and the parallel flat plates 2 and/or 3 are inclined by a predetermined angle. The inclination angles of the parallel flat plates 2 and 3 are detected by a sensor 182, and the inclination angle information of the parallel flat plates 2 and 3 acquired by the sensor 182 is input into the control circuit 140 to be referred to at the time of sending an instruction signal to the driver circuit 180.

As a concrete product, the imaging apparatus 100 can take various kinds of forms. For example, the imaging apparatus 100 can be widely applied as a camera unit or the like of digital input output equipment such as a digital still camera, a digital video camera, a cellular phone in which a camera is incorporated, a personal digital assistant (PDA) in which a camera is incorporated, and the like.

In addition, any of the concrete form of each unit and numerical values of each of the embodiments and the numerical value examples described above are shown as only examples of the materialization performed at the time of implementing the present invention, and the scope of the present invention should not be interpreted to be limited to those concrete examples.

The present application contains subject matter related to Japanese Patent Applications JP 2005-313255 filed in the Japanese Patent Office on Oct. 27, 2005, the entire contents of which being incorporated herein by reference.

What is claimed is:

1. A zoom lens including a varifocal lens unit including a plurality of movable lens groups, and a prism disposed on an image side of the varifocal lens unit, wherein:

the prism has an incident plane into which a light flux from the varifocal lens unit enters, and an exit plane from which the light flux is emitted toward an image plane, the exit plane capable of being inclined with respect to an optical axis, the exit plane inclined in accordance with a following conditional expression (1), $$\alpha = -f \times \theta / [Bf(n-1)] \quad (1)$$

where $\alpha$: an angle formed by a normal of the exit plane and the optical axis, f: a focus distance of a whole lens system, $\theta$: a turning angle of a lens system, Bf: a distance from the exit plane of the prism to the image plane along the optical axis, and n: a refraction index of the prism.

2. A zoom lens including a varifocal lens unit including a plurality of movable lenses, and a prism disposed on an image side of the varifocal lens unit, wherein:

the prism has an incident plane into which a light flux from the varifocal lens unit enters, and an exit plane from which the light flux is emitted toward an image plane, the incident plane capable of being inclined with respect to an optical axis, the incident plane being inclined in accordance with a following conditional expression (2), $$\alpha=-f\times\theta/[(Bf+D/n)\times(n-1)] \quad (2)$$

where $\alpha$: an angle formed by a normal of the incident plane with the optical axis, f: a focus distance of a whole lens system, $\theta$: a turning angle of a lens system, Bf: a distance from the exit plane of the prism to the image plane along the optical axis, n: a refraction index of the prism, and D: a thickness of the prism.

3. The zoom lens according to claim 1 or 2, wherein:

the varifocal lens unit includes a front side lens group, an aperture diaphragm and a rear side lens group, which are arranged in order from an object side; and following conditional expressions (3) and (4) are satisfied:

$$0.25<\phi b/\phi<0.8 \quad (3)$$

$$3<Bf\times FNO/Ymax \quad (4)$$

where $\phi b$: refractive power of the rear side lens group in a wide angle end, $\phi$: refractive power of a whole lens system in the wide angle end, Bf: a distance from the exit plane of the prism to the image plane along the optical axis, FNO: an F number in a telephoto end, and Ymax: a maximum image height.

4. The zoom lens according to claim 3, wherein:

both of the front side lens group and the rear side lens group severally includes at least one or more lens groups each of which is movable when a lens position changes from the wide angle end to the telephoto end, and a following conditional expression (5) is satisfied:

$$0.4<Ds/TL<0.7 \quad (5)$$

where

Ds: a distance from the aperture diaphragm in the wide angle end to the image plane along the optical axis, and TL: a distance from a lens surface at a position nearest to the object side of the zoom lens in the wide angle end to the image plane along the optical axis.

5. The zoom lens according to claim 1, wherein:

the prism has a first parallel flat plate, a liquid and a second parallel flat plate, which are located in order from the object side;

an object side lens surface of the first parallel flat plate forms the incident plane; and an image side lens surface of the second parallel flat plate forms the exit plane.

6. The zoom lens according to claim 1, wherein:

the prism has a first lens and a second lens, which are located in order from the object side;

an object side lens surface of the first lens is a plane forming the incident plane, and an image side lens surface of the second lens forms the exit plane; and an image side lens surface of the first lens and an object side lens surface of the second lens are a curved surface with a same radius of curvature, the curved surfaces being slidably contacted with each other directly or with a friction reduction medium put between them.

7. An imaging apparatus comprising:

a zoom lens;

an imaging device converting an optical image formed by the zoom lens into an electric signal;

camera shake detection means for detecting a turning angle of the zoom lens;

camera shake control means for calculating a movement correction angle for correcting an image blur caused by turning of the zoom lens detected by the camera shake detection means and sending a correction signal to make the zoom lens to a predetermined state in which a field of view is shifted by an amount corresponding to the movement correction angle; and a camera shake drive unit to make the zoom lens into the predetermined state based on the correction signal; wherein the zoom lens includes a varifocal lens unit having a plurality of movable lens groups, and a prism disposed on an image side of the varifocal lens unit;

the prism has an incident plane on which a light flux from the varifocal lens unit enters, and an exit plane from which the light flux is emitted toward an image plane, the exit plane configured to be inclinable to an optical axis; and the camera shake drive unit receives the correction signal to incline the exit plane in accordance with a following conditional expression (1):

$$\alpha=-f\times\theta/[Bf(n-1)] \quad (1)$$

where $\alpha$: an angle formed by a normal of the exit plane and the optical axis, f: a focus distance of a whole lens system, $\theta$: a turning angle of a lens system, Bf: a distance from the exit plane of the prism to the image plane along the optical axis, and n: a refraction index of the prism.

8. An imaging apparatus comprising:

a zoom lens;

an imaging device converting an optical image formed by the zoom lens into an electric signal;

camera shake detection means for detecting a turning angle of the zoom lens;

camera shake control means for calculating a movement correction angle for correcting an image blur caused by turning of the zoom lens detected by the camera shake detection means and sending a correction signal to make the zoom lens to a predetermined state in which a field of view is shifted by an amount corresponding to the movement correction angle; and a camera shake drive unit to make the zoom lens into the predetermined state based on the correction signal; wherein the zoom lens includes a varifocal lens unit having a plurality of movable lens groups, and a prism disposed on an image side of the varifocal lens unit;

the prism has an incident plane on which a light flux from the varifocal lens unit enters, and an exit plane from which the light flux is emitted toward an image plane, the incident plane capable of being inclined with respect to an optical axis; and the camera shake drive unit receives the correction signal to incline the incident plane in accordance with a following conditional expression (2):

$$\alpha = -f \times \theta / [(Bf + D/n) \times (n-1)] \quad (2)$$

where

α: an angle formed by a normal of the incident plane with the optical axis,
f: a focus distance of a whole lens system,
θ: a turning angle of a lens system,
Bf: a distance from the exit plane of the prism to the image plane along the optical axis,
n: a refraction index of the prism, and
D: a thickness of the prism.

* * * * *